(12) United States Patent
Chi et al.

(10) Patent No.: US 7,043,702 B2
(45) Date of Patent: May 9, 2006

(54) METHOD FOR VISUALIZING USER PATH THROUGH A WEB SITE AND A PATH'S ASSOCIATED INFORMATION SCENT

(75) Inventors: Ed H. Chi, Palo Alto, CA (US); Peter L. T. Pirolli, San Francisco, CA (US); James E. Pitkow, San Francisco, CA (US)

(73) Assignee: Xerox Corporation, Stamford, CT (US)

( * ) Notice: Subject to any disclaimer, the term of this patent is extended or adjusted under 35 U.S.C. 154(b) by 571 days.

(21) Appl. No.: 09/809,388

(22) Filed: Mar. 15, 2001

(65) Prior Publication Data

US 2002/0130907 A1 Sep. 19, 2002

(51) Int. Cl.
*G06G 3/00* (2006.01)

(52) U.S. Cl. .............. 715/853; 854/848; 854/782; 854/834

(58) Field of Classification Search ............. 715/848, 715/854, 853, 782, 734; 345/440, 419, 420, 345/848, 854, 853, 782, 834
See application file for complete search history.

(56) References Cited

U.S. PATENT DOCUMENTS

| 5,043,920 A | * | 8/1991 | Malm et al. ............ 345/419 |
| 5,295,243 A | * | 3/1994 | Robertson et al. ......... 345/848 |
| 5,333,254 A | * | 7/1994 | Robertson ................. 345/853 |
| 5,539,869 A | * | 7/1996 | Spoto et al. ............. 715/500.1 |
| 6,088,737 A | * | 7/2000 | Yano et al. ................ 709/235 |
| 6,151,595 A |   | 11/2000 | Pirolli et al. ................ 707/1 |
| 6,335,737 B1 | * | 1/2002 | Grossman et al. ........... 345/719 |
| 6,496,208 B1 | * | 12/2002 | Bernhardt et al. .......... 345/853 |

OTHER PUBLICATIONS

U.S. Appl. No. 09/062,341, filed Apr. 17, 1998, Chi et al.
U.S. Appl. No. 09/062,513, filed Apr. 17, 1998, Pitkow et al.
U.S. Appl. No. 09/444,208, filed Nov. 19, 1999, Pitkow et al.
U.S. Appl. No. 09/540,063, filed Mar. 31, 2000, Chi et al.
U.S. Appl. No. 09/540,976, filed Mar. 31, 2000, Pirolli et al.
Chi, Ed Huai–hsin; Barry, Phillip; Riedl, John and Konstan, Joseph, "A Spreadsheet Approach to Information Visualization," *Proceedings of the Symposium on Information Visualization*, IEEE CS, 1997, Phoenix, Arizona, pp. 17–24, 116.
Chi, Ed H. and Card, Stuart K., "Sensemaking of Evolving Web Sites Using Visualization Spreadsheets," *Proceedings of the Symposium on Information Visualization*, IEEE Press, 1999, San Francisco, California, pp. 18–25, 142.

(Continued)

*Primary Examiner*—Kristine Kincaid
*Assistant Examiner*—Peng Ke
(74) *Attorney, Agent, or Firm*—Fliesler Meyer LLP

(57) ABSTRACT

A method and system for visualizing actual and predicted usage patterns through a web site is provided. A plurality of web pages may be represented as a node and visualized on a dome tree. The dome tree is a three-dimensional image of a dome, with a portion of the outer wall removed, displayed on a two-dimensional monitor. Paths into and out of each node are displayed using a variety of colors and patterns and information relating to the nodes and paths may also be accessed. By designating a web page as the root node each of the associated pages are laid out within the dome tree radially based on actual usage information. Predicted information for each node is displayed as a bar near the node, thereby assisting a user in understanding the relationship between actual and predicted usage patterns.

36 Claims, 24 Drawing Sheets

OTHER PUBLICATIONS

Chi, E.H.; Pitkow, J.; Mackinlay, J., Pirolli, P.; Gossweiler, R and Card, S.K., "Visualizing the Evolution of Web Ecologies," *CHI '98, Proceedings of the Conference on Human Factors in Computing Systems*, Apr. 18–23, 1998, Los Angeles, California.

Chi, Ed Huai–hsin and Riedl, John T., "An Operator Interaction Framework for Visualization Systems," *Proceedings of the IEEE Information Visualization Symposium*, Oct. 19–20, 1998, pp. 63–70.

Furnas, George, W., "Effective View Navigation," *Proceedings of the Conference on Human Factors in Computing Systems, CHI 97*, Mar. 22–27, 1997, Atlanta, Georgia, pp. 367–374.

Pirolli, Peter, "Computational Models of Information Scent–Following in a Very Large Browsable Text Collection," *Proceedings of the Conference on Human Factors in Computing Systems, CHI 97*, Mar. 22–27, 1997, Atlanta, Georgia, pp. 3–10.

Pirolli, Peter and Card, Stuart K., "Information Foraging," *Psychological Review*, Jan. 1999.

Pirolli, Peter L.T. and Pitkow, James E., "Distributions of Surfers' Paths Through the World Wide Web: Empirical Characterizations," *World Wide Web* 2 1999, pp. 29–45.

Pirolli, Peter; Pitkow, James and Rao, Ramana, "Silk from a Sow's Ear: Extracting Usable Structures from the Web," *Proceedings of the Conference on Human Factors in Computing Systems, CHI 96*, Apr. 13–18, 1996, Vancouver, British Columbia, Canada, pp. 118–125.

Pitkow, James and Pirolli, Peter, ", Life, Death, and Lawfulness of the Electronic Frontier," *Proceedings of the Conference on Human Factors in Computing Systems, CHI 97*, Mar. 22–27, 1997, Atlanta, Georgia, pp. 383–390.

Pitkow, James and Pirolli, Peter, "Mining Longest Repeating Subsequences to Predict World Wide Web Surfing," *Proceedings of the USENIX Conference on Internet*, 1999, pp. 139–150.

Salton, Gerard; Allan, James; Buckley, Chris and Singhal, Amit, "Automatic Analysis, Theme Generation, and Summarization of Machine–Readable Texts," in *Readings in Information Visualization*, 1999, Morgan Kaufman, Los Altos, California, pp. 413–418.

Spool, Jared M.; Scanlon, Tara; Snyder, Carolyn and Schroeder, Will, "Measuring Website Usability," *Proceedings of the Conference on Human Factors in Computing Systems, CHI 98*, Apr. 18–23, 1998, Los Angeles, California, p. 390.

* cited by examiner

| TO NODE<br>FROM NODE | 1 | 2 | 3 | 4 | 5 | 6 | 7 | 8 | 9 |
|---|---|---|---|---|---|---|---|---|---|
| 1 | 0 | 1 | 0 | 1 | 0 | 0 | 0 | 0 | 0 |
| 2 | 0 | 0 | 1 | 0 | 1 | 0 | 0 | 0 | 0 |
| 3 | 0 | 1 | 0 | 0 | 0 | 1 | 0 | 0 | 0 |
| 4 | 1 | 0 | 0 | 0 | 1 | 0 | 1 | 0 | 0 |
| 5 | 0 | 1 | 0 | 1 | 0 | 1 | 0 | 1 | 0 |
| 6 | 0 | 0 | 1 | 0 | 1 | 0 | 0 | 0 | 1 |
| 7 | 0 | 0 | 0 | 1 | 0 | 0 | 0 | 1 | 0 |
| 8 | 0 | 0 | 0 | 0 | 1 | 0 | 1 | 0 | 1 |
| 9 | 0 | 0 | 0 | 0 | 0 | 1 | 0 | 1 | 0 |

| TO NODE / FROM NODE | 1 | 2 | 3 | 4 | 5 | 6 | 7 | 8 | 9 |
|---|---|---|---|---|---|---|---|---|---|
| 1 |  | 87 |  | 35 |  |  |  |  |  |
| 2 | 52 |  | 74 |  | 6 |  |  |  |  |
| 3 |  | 62 |  |  |  | 33 |  |  |  |
| 4 | 98 |  |  |  | 92 |  | 75 |  |  |
| 5 |  | 28 |  | 85 |  | 76 |  | 48 |  |
| 6 |  |  | 14 |  | 4 |  |  |  | 51 |
| 7 |  |  |  | 99 |  |  |  | 63 |  |
| 8 |  |  |  |  | 46 |  | 79 |  | 65 |
| 9 |  |  |  |  |  | 66 |  | 26 |  |

FIG. 12

METHOD FOR VISUALIZING USER PATH THROUGH A WEB SITE AND A PATH'S ASSOCIATED INFORMATION SCENT

CROSS-REFERENCE TO RELATED APPLICATIONS

This Application is related to the following co-pending U.S. patent applications and to the following issued U.S. Patents, all of which are commonly owned by the owner of the present application:

(1) Ser. No. 09/540,063, entitled "System And Method For Inferring User Information Need In A Hypermedia Linked Document Collection," Inventors: Ed. H. Chi, Peter L. T. Pirolli, James E. Pitkow, filed on Mar. 31, 2000;

(2) U.S. Pat. No. : 6,671,711, entitled "System And Method For Predicting Web User Flow By Determining Association Strength Of Hypermedia Links," Inventors: Peter L. T. Pirolli, Ed H. Chi, James E. Pitkow, issued on Dec. 30, 2003;

(3) Ser. No. 09/444,208, entitled "System For Predictive Modeling Using Longest Repeating Subsequences," Inventors: James E. Pitkow, Peter L. T. Pirolli, filed on Nov. 19, 1999; and, (4) U.S. Pat. No. : 6,509,898, entitled "Usage Based Methods Of Traversing and Displaying Generalized Graph Structures" Inventors: EdH. Chi, Peter L. T. Pirolli, James E. Pitkow, Rich Gossweller, Jock D. Mackinlay, Stuart K. Card, issued on Jan. 21, 2003;

all of which are incorporated herein by reference.

BACKGROUND OF THE INVENTION

1. Field of the Invention

The present invention is related to the field of displaying generalized graph structures and access patterns, such as World Wide Web sites, actual usage patterns, and predicted usage patterns, so that the important relationships are exposed.

2. Discussion of the Related Art

The World-Wide Web ("web") is perhaps the most important information access mechanism to be introduced to the general public in the 20th Century. As larger numbers of organizations rely on the Internet to distribute information to potential consumers and investors, they also realize its potential for distributing and organizing large volumes of data for later retrieval by employees and business partners. A company's web site is rapidly becoming one of its most important business investments.

As an information repository, a web site generally receives high amounts of usage. Due to the current trend of such high use, there is an increasing demand to efficiently organize a web site, prior to and after deployment, so that users can easily find the information they are looking for. For example, if it is predicted that users will often be searching for sales literature when they access a site it would be beneficial to provide a link on the initial page to the literature, or display the relevant literature on the initial page, thereby eliminating the need for a user to delve through several web pages before finding the information.

Once the web page has been deployed there is an ongoing need for analysts to be able to determine whether their predicted access patterns resemble actual usage. This information includes how the site is actually accessed, user access patterns, and whether users are finding the information they are searching for. Analysts want to be able to analyze the evolving web site, its use, and compare that data with predicted data.

Because of analysts' increasing desire to predict a user's access patterns, needs and goals, and discover and understand a user's actual access patterns, relationships between web page content and access patterns, and to efficiently structure a web sites' topology, a need exists far a set of visualization tools which aid in the process of web site design, analysis, and comparison of actual and predicted data. Since web sites are dynamically changing over time, analysts need to understand how changes to the topology affect usage and whether the actual usage resembles predicted usage. Although some conventional web site display methods encode usage information in the visualization, conventional methods do not reference usage information in generating the structure to be displayed from the generalized graph structure. Additionally, typical methods do not allow analysts to compare predicted data with actual data. Moreover, conventional systems do not allow visualization of data in a three-dimensional area in such a way that occlusion of data is reduced.

SUMMARY OF THE INVENTION

A conventional technique for understanding a complex generalized graph structure is to display a representation of the links and nodes which constitute the generalized graph structure. One view of the World Wide Web is that of a generalized graph structure, with nodes representing web pages and lines representing use paths or links between the nodes. Because of the complexity of the generalized graph structure as evidenced by the large number of links between nodes, some links of the generalized graph structure are usually not presented in the representation so as to enable a viewer or user to effectively process the representation.

According to an aspect of the present invention, roughly described, a method for displaying a tree structure having a root node and a plurality of first level nodes is provided. The method comprising the steps of positioning the root node on a two dimensional plane, positioning the plurality of first level nodes in the tree structure radially outward a first distance from the root node, and shifting the plurality of first level nodes a second distance relative to the plane, thereby creating a three dimensional effect of a dome between the root node and the plurality of first level nodes.

According to another aspect ofthe present invention the tree structure further includes a plurality of second level nodes, and the method further includes the steps of positioning the plurality of second level nodes on the plane radially about the root node a third distance which is greater than the first distance, and shifting the plurality of second level nodes a fourth distance relative to the plane.

According to still another aspect of the present invention, a method for displaying information related to a node is provided. The method comprising the steps of selecting the node, displaying a first set of paths, representing paths into the node, responsive to selecting the node, displaying a second set of paths, representing paths out of the node, responsive to selecting the node, and displaying a list of information related to the selected node.

According to yet another aspect ofthe present invention, an article of manufacture including an information storage medium wherein is stored information for programming a computer to perform a method of displaying a tree structure having a root node and a plurality of first level nodes is provided. The method comprising the steps of positioning the root node on a two dimensional plane, positioning the plurality of first level nodes in the tree structure radially outward a first distance from the root node, and shifting the plurality of first level nodes a second distance relative to the plane, thereby creating a three dimensional effect of a dome between the root node and the plurality of first level nodes.

According to an aspect of the present invention, an article of manufacture including an information storage medium wherein is stored information for programming a computer to perform a method of displaying information related to a node, is provided. The method comprising the steps of selecting the node, displaying a first set of paths, representing paths into the node, responsive to selecting the node, displaying a second set of paths, representing paths out of the node, responsive to selecting the node, and displaying a list of information related to the selected node.

According to still another aspect of the present invention, an apparatus for displaying a tree structure having a root node and a plurality of first level nodes, is provided. The apparatus comprising a processor, a display device in communication with the processor, and a processor readable storage medium in communication with the processor, containing process readable program code for programming the apparatus to perform a method of displaying the tree structure. The method including the steps of positioning the root node on a two dimensional plane, positioning the plurality of first level nodes in the tree structure radially outward a first distance from the root node, and shifting the plurality of first level nodes a second distance relative to the plane, thereby creating a three dimensional effect of a dome between the root node and the plurality of first level nodes.

According to another aspect of the present invention, an apparatus for displaying information related to a node is provided. The apparatus includes a processor, a display device in communication with the processor, and a processor readable storage medium in communication with the processor, containing process readable program code for programming the apparatus to perform the method displaying information related to a node. The method comprising the steps of selecting the node, displaying a first set of paths, representing paths into the node, responsive to selecting the node, displaying a second set of paths, representing paths out of the node, responsive to selecting the node, and displaying a list of information related to the selected node.

BRIEF DESCRIPTION OF THE DRAWINGS

FIG. 8 illustrates a topology matrix corresponding to the generalized graph structure shown in FIG. 7, according to an embodiment of the present invention.

FIG. 12 is a usage parameter matrix pertaining to the links of the generalized graph structure shown in FIG. 7, according to an embodiment of the present invention.

Figure 1:
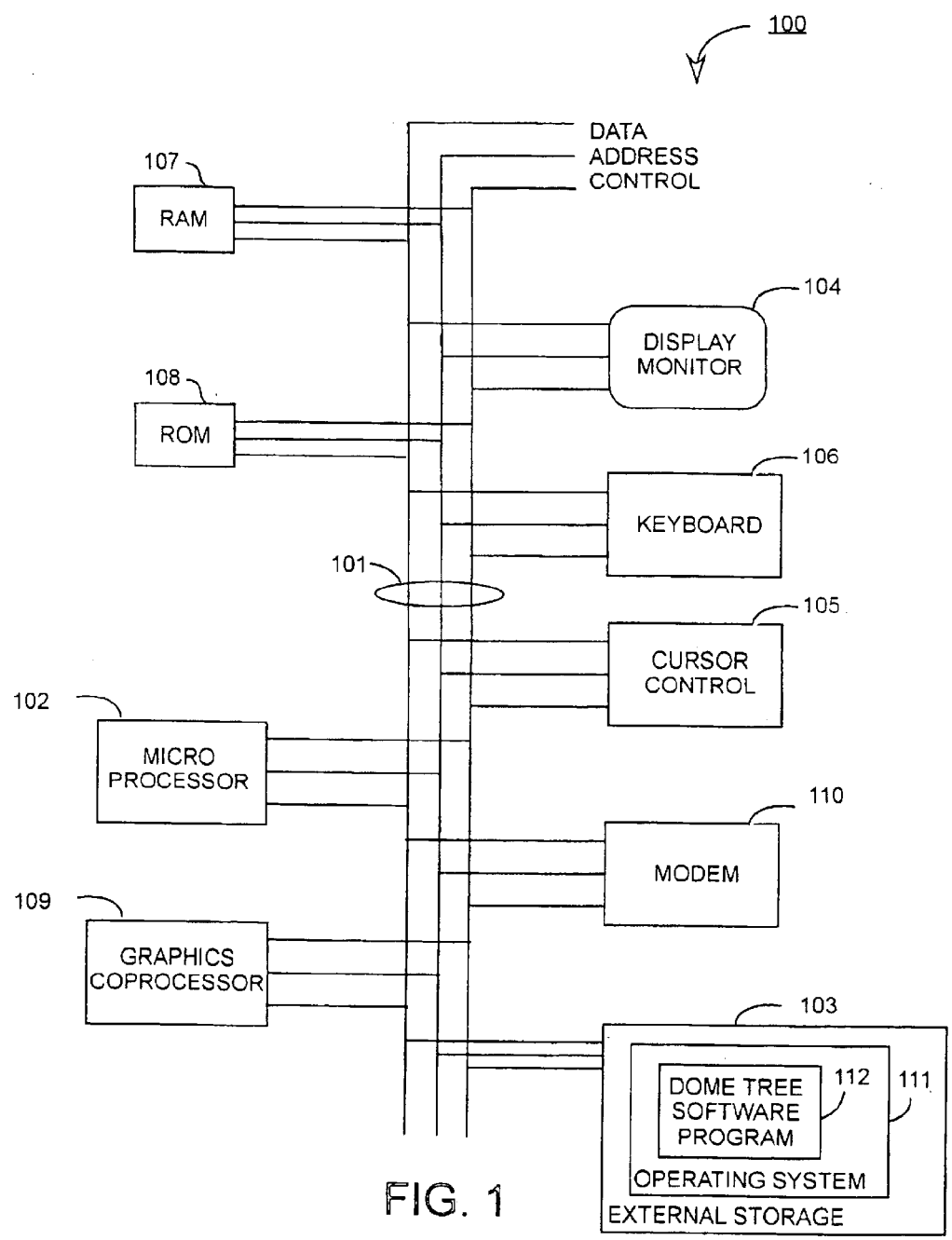
FIG. 1 illustrates a general purpose computer suitable for performing the methods of the present invention, according to an embodiment of the present invention.

The Figures are more fully explained in the following Detailed Description. In the Figures, like reference numerals denote the same elements; however, like parts are sometimes labeled with different reference numerals in different Figures in order to clearly describe embodiments of the present invention.

DETAILED DESCRIPTION

The world wide web is a complex large directed graph. Visualizing a directed graph is a well-known and difficult problem. In fact, none of the current graph layout algorithms can deal with a 7,000-node graph in a reasonable manner. However, as a sub-domain of directed graphs, web site linkage structures tend to be rather hierarchical. That is, while a web site is not a tree, a tree representation often approximates a web site well. While the scope of the present invention extends far beyond applications to the web, the web is used to exemplify embodiments of the present invention.

Using a breadth-first traversal algorithm transforms a web graph into a tree by placing a node, which represents a web page, as closely to the root node as possible. After obtaining this tree, the structure may then be visualized using a dome tree visualization technique, according to an embodiment of the present invention.

A dome tree exists in a three dimensional work space and is created by stacking and aligning a two-dimensional three-quarter(¾) circular slice for each layer into a tiered dome representation. Each successive three-quarter circle has a diameter which is larger than the preceding three-quarter circle and denotes levels in the tree. Each layer is augmented in the third dimension, thereby producing what appears to be a dome having a quarter of the wall removed. Because conventional display monitors are two dimensional display devices, a three-dimensional display structure must be projected onto the two dimensional display. The third dimension is thus projected onto the first two. However, this projection does not negate the power of the three dimensional structure. Most readers can easily attest that although movies are projected onto a two dimensional screen, the three dimensional content being displayed is readily apparent. The three dimensional effect of the dome is enhanced in many respects. First, by connecting nodes of each layer with nodes of other layers based on access patterns it appears that the information is displayed on the inside of the dome and generating from the bottom of the dome, where the root node is located, outward. Additionally, removing a quarter of the dome wall creates the appearance that one is looking into the dome through a gap in the dome wall. Not only does removing a quarter of the dome wall enhance the three dimensional appearance, there is also no occlusion caused by the third dimension since a viewer can view the information by looking through the removed portion of the dome wall.

The layout algorithm runs in two passes. In the first pass, the algorithm traverses the entire hierarchy using post-order traversal. At each node, the algorithm calculates the number of leaf nodes in that sub-tree. So the total number of leaves in the tree is known. The algorithm then calculates the amount of angular space to be allocated for each leaf node (270 degrees divided by the total number of leaves). In the second pass, the algorithm traverses the hierarchy using breadth-first traversal. At each node, it allocates the amount of angular space for that node by looking to see how many leaf nodes are rooted at that sub-tree. In this manner, each leaf node is provided a fixed amount of angular space.

A viewer can gain increased understanding of visualizations if the choices made in mapping data into visual presentations is performed intelligently and strategically. The dome tree has several advantages. First, the structure of the tree is visualized compactly, with the pattern easily recognizable. Second, by eliminating a portion of the dome wall, in an embodiment one quarter of the dome wall, when viewed at different orientations and angles, there are no occlusion problems because it appears to a viewer that they are looking at the inside of the dome through the section that has been removed. Third, unlike conventional two dimensional trees, a viewer can manipulate the view of the dome tree in multiple ways. For example, a viewer can zoom into different portions of the dome tree, rotate the angle that the dome tree is being viewed from, or alter the shape of the dome tree thereby increasing or decreasing the distance between nodes and levels.

The visualization itself actually validates the choice of a usage-based traversal algorithm. The high traffic areas are usually concentrated near the root node. This means that the algorithm places easy to reach nodes starting from the root node. As the nodes get farther and farther away from the root node, the node has a lesser possibility of being accessed. Since there are normally a larger quantity of high traffic nodes near the root node the dome tree design provides a visually pleasing arrangement of the nodes.

FIG. 1 illustrates a general purpose computer architecture 100 suitable for implementing embodiments of the present invention. The general purpose computer 100 includes at least a microprocessor 102, a display monitor 104, and a cursor control device 105. The cursor control device 105 can be implemented as a mouse, a joy stick, a series of buttons, or any other input device which allows a user to control position of a cursor or pointer on the display monitor 104. The general purpose computer may also include random access memory 107, external storage 103, ROM memory 108, a keyboard 106, a modem 110 and a graphics co-processor 109. All of the elements of the general purpose computer 100 may be tied together by a common bus 101 for transporting data between the various elements. The bus 101 typically includes data, address, and control signals. Although the general purpose computer 100 illustrated in FIG. 1 includes a single data bus 101 which ties together all of the elements of the general purpose computer 100, there is no requirement that there be a single communication bus 101 which connects the various elements of the general purpose computer 100. For example, the microprocessor 102, RAM 107, ROM 108, and graphics co-processor 109 might be coupled with a data bus while the hard disk 103, modem 110, keyboard 106, display monitor 104, and cursor control device 105 are connected together with a second data bus (not shown). In this case, the first data bus 101 and the second data bus (not shown) could be linked by a bidirectional bus interface (not shown). Alternatively, some of the elements, such as the microprocessor 102 and graphics co-processor 109 could be connected to both the first data bus 101 and the second data bus (not shown) and communication between the first and second data bus would occur through the microprocessor 102 and graphics co-processor 109. The methods of the present invention are thus executable on any general purpose computing architecture such as the one 100 illustrated in FIG. 1, but there is clearly no limitation that this architecture is the only one which can execute the methods of the present invention.

In an embodiment, the external storage 103 may include an operating system 111, such as Microsoft Windows®, or Unix® which is capable of executing programs or applications using the general purpose computer 100. In an embodiment the present invention is implemented as a dome tree software program 112, and is stored on the external storage 103. In an embodiment the dome tree software program 112 maybe accessed, executed, and displayed on the display monitor 104 by an individual using the keyboard 106 or cursor control 105. In alternative embodiments, the present invention may be accessed over the Internet.

As will be understood, embodiments of the present invention, such as dome tree software program 112, maybe in the form of a software program, a software object, a software function, a software subroutine, a software method, a software instance, a code fragment, a hardware operation or user operation, singly or in combination.

Additionally, in an embodiment of the present invention the external storage device 103 may be an article of manufacture, such as a computer readable medium. For example, external storage 103 may be a magnetic hard disk, an optical disk, a floppy disk, CD-ROM (Compact Disk Read-Only Memory), RAM (Random Access Memory), ROM (Read-Only Memory), or other readable or writeable data storage technologies, singly or in combination.

Figure 2:
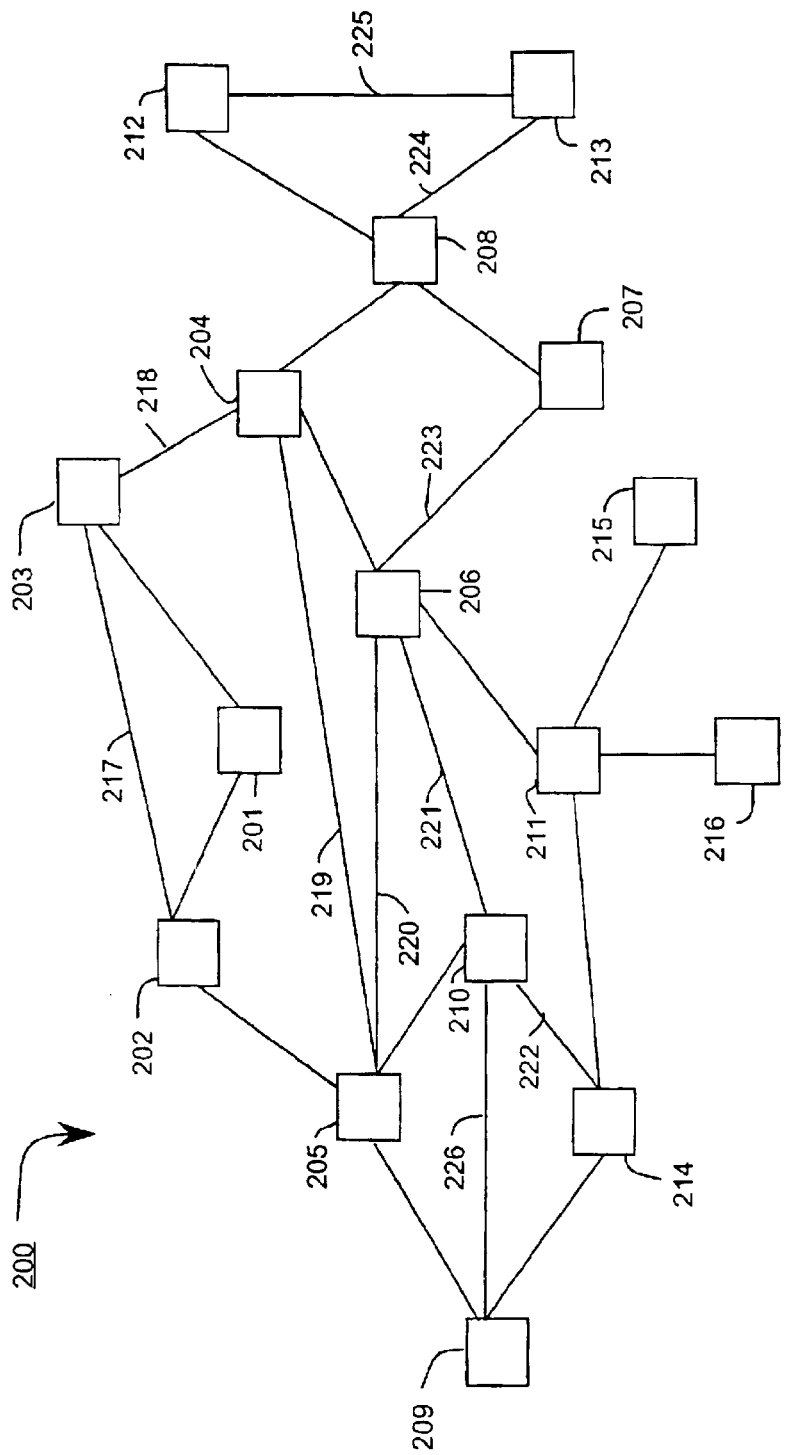
FIG. 2 illustrates a generalized graph structure, according to an embodiment of the present invention.

FIG. 2 illustrates a generalized graph structure 200 consisting of sixteen nodes 201 through 216, according to an embodiment of the present invention. The various nodes 201 through 216 of the generalized graph structure 200 are connected to each other by links, such as those labeled 217 through 226. The links connecting the various nodes may be either bidirectional or unidirectional. Throughout this patent document and in all of its Figures, a bidirectional link will be represented as a link having no arrows at either end, and a unidirectional link will be denoted by a link having an arrow at one end or the other, which will indicate that a link exists only in the direction that the arrow is pointing. For example, link 217 in FIG. 2 represents the ability to move from node 202 to node 203, as well as the ability to move from node 203 to node 202. Clearly, several alternative routes exist for moving from a node to another node. Because of the large number of links in a large generalized graph structure, often it is impractical to display all of the links. Therefore, when presenting a user with a visual representation of a generalized graph structure, only a subset of all links that exist in the generalized graph structure are displayed. The subset of links which is chosen for display must show a path from every node in the generalized graph structure to every other node in the generalized graph structure. A tree structure is often used to accomplish this goal.

Figure 3:
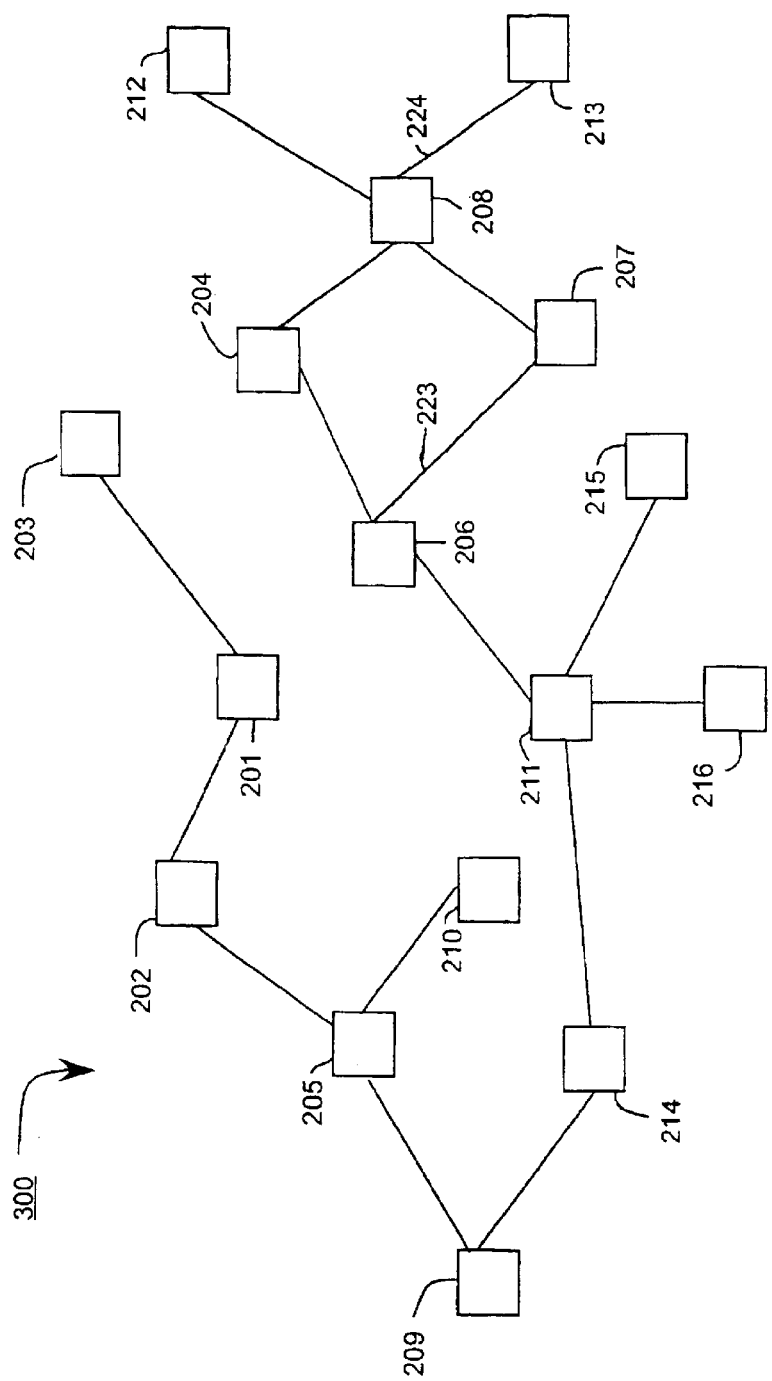
FIG. 3 illustrates a tree structure generated from the generalized graph structure illustrated in FIG. 2, according to an embodiment of the present invention.

FIG. 3 illustrates a tree structure representation 300 of the generalized graph structure 200 illustrated in FIG. 2, according to an embodiment of the present invention. Links 217 through 226 are not shown in the tree structure 300 corresponding to the generalized graph structure 200. Links 217 through 226 were omitted because they create cycles in the generalized graph structure 200. A tree structure has no cycles; in other words, there is only one path from any node to any other node. In the tree structure representation 300, there is only one path from any node to any other node because all cycles have been broken.

Figure 4:
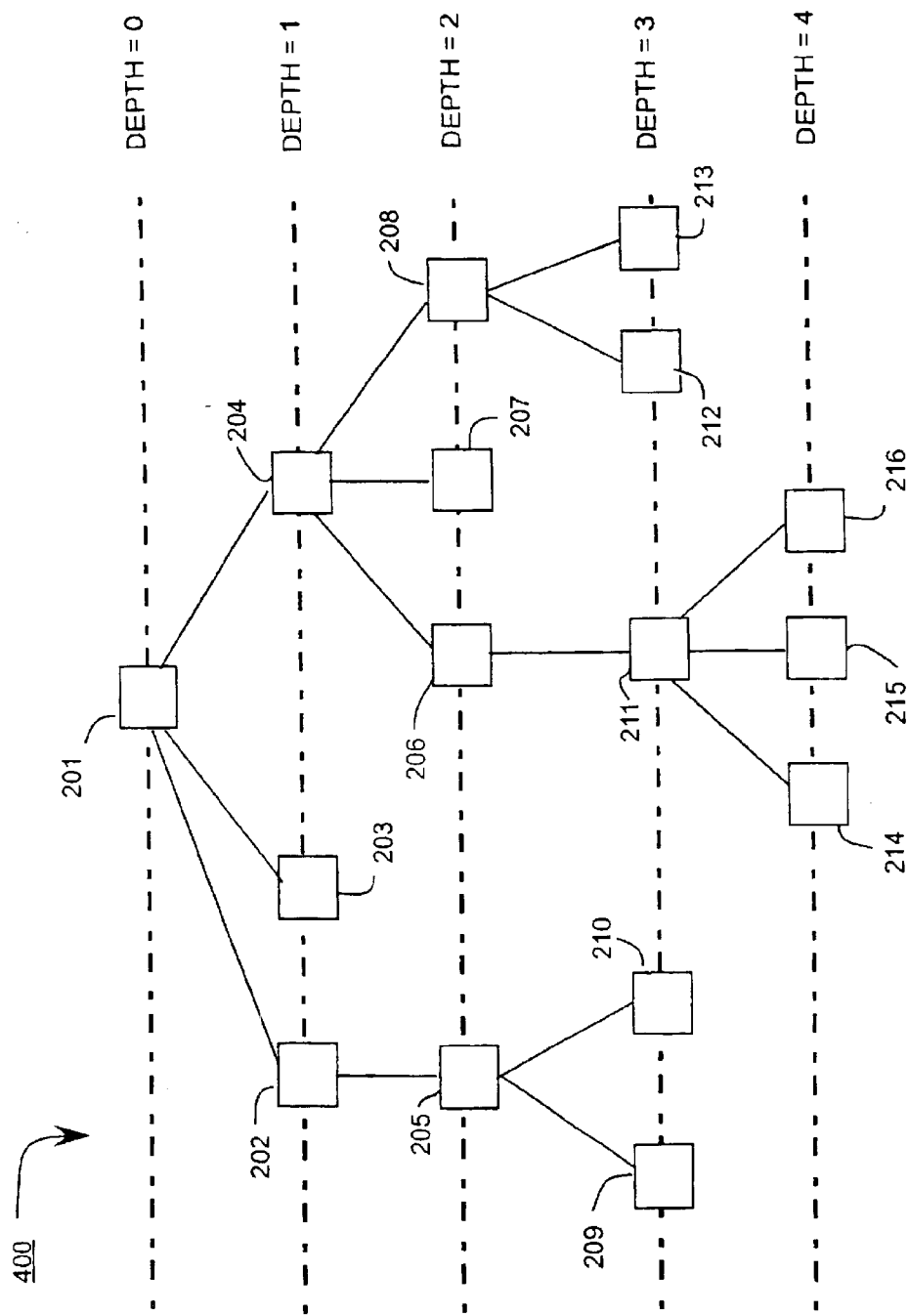
FIG. 4 is another illustration of the tree structure shown in FIG. 3 which shows the depth of each node, according to an embodiment of the present invention.

FIG. 4 shows another tree structure representation 400 of the tree structure representation 300 illustrated in FIG 3, according to an embodiment of the present invention. In the tree structure 400, node 201 is identified as the root node. The root node 201 has a depth of zero. The children of the root node 201 are nodes 202, 203, and 204, which exist at a depth of one. Node 202 has one child (node 205) and node 204 has three children (nodes 206, 207, and 208). Nodes 205 through 208 are at depth two. The depth of any node is determined by the number of links which must be traversed in order to travel back to the root node. Nodes 209, 210, 203, 214, 215, 216, 207, 212, and 213 are leaf nodes, because they have no children.

Figure 5:
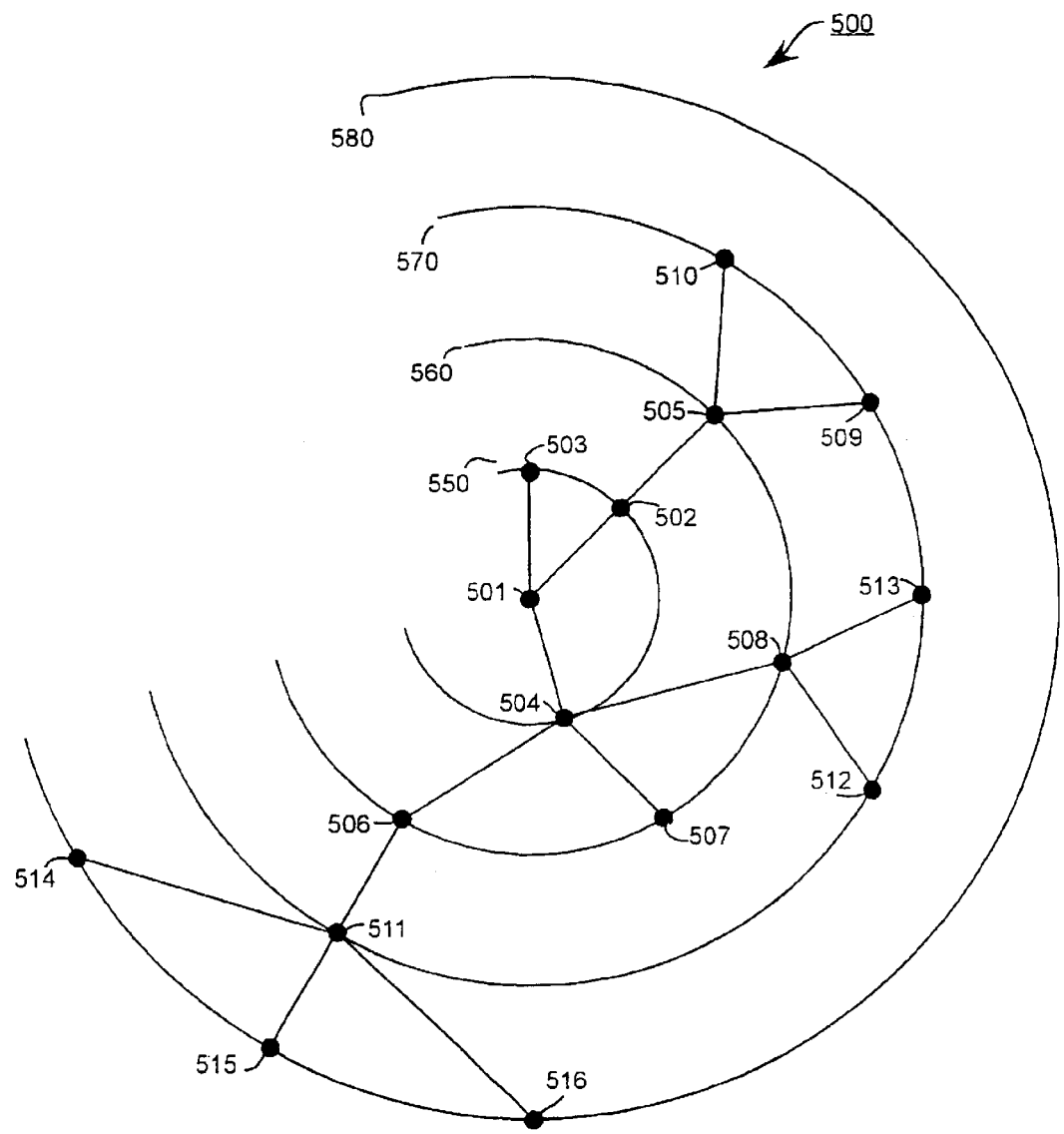
FIG. 5 illustrates a two-dimensional layout of the tree structure shown FIGS. 3 and 4, according to an embodiment of the present invention.

FIG. 5 illustrates a two-dimensional layout 500 of the tree structure 400 shown in FIG. 4 which may be used in generating a dome tree, according to an embodiment of the present invention. The center point 501 of the layout 500 corresponds to the root node 201 of the tree structure 400. Each of the points 501 through 516 represent one of the nodes 201 through 216. Specifically, by adding 300 to the reference numeral associated with each node of the tree structure 400, the reference numeral corresponding to the point in the layout 500 for each node of the tree structure 400 is computed. In other words, node 201 in FIG. 4 is illustrated as node 501 in the layout 500, node 202 is represented by point 502, node 203 is represented by point 503, and node 216 is represented by point 516. Three-quarter circle 550 contains all points which represent nodes that are at a depth of one from the root node represented by point 501. Three-quarter circle 560 contains all points representing nodes at depth two. Three-quarter circle 570 contains all points representing nodes at depth three, and three-quarter circle 580 contains all points representing nodes at depth four. (The points in FIG. 5 display and represent the nodes of FIG. 4; thus the term node is sometimes used hereinafter to refer to the point on a display representing a node.)

The angular placement of each point representing a node in the layout 500 is determined as follows. The total number of leaf nodes is determined, and the 270° of the circle is divided by that total number of leaf nodes. In this instance, there are nine leaf nodes represented by points 512, 513, 509, 510, 503, 514, 515, 516, and 507. Each leaf node thus has 30° of angular space dedicated to it in the layout 500. The angular placement of a parent node is the angle which bisects the angle formed by its outer most leaf nodes and the root node. For example, point 504 representing node 204 has outer most leaves 214 and 213, which correspond to points 514 and 513, respectively, on layout 500. The angle formed by an outer most leaf 514, the outer most leaf point 513, and the root node 501 is 150°. Therefore, the angle of parent node 504 is the angle bisecting that 150° angle. Similarly, parent point 511 has children points 514, 515, and 516. The children points 516 and 514 together with the root node 501 form a 60° angle, therefore parent point 511 is placed at an angle which bisects that 60° angle.

Figure 6:
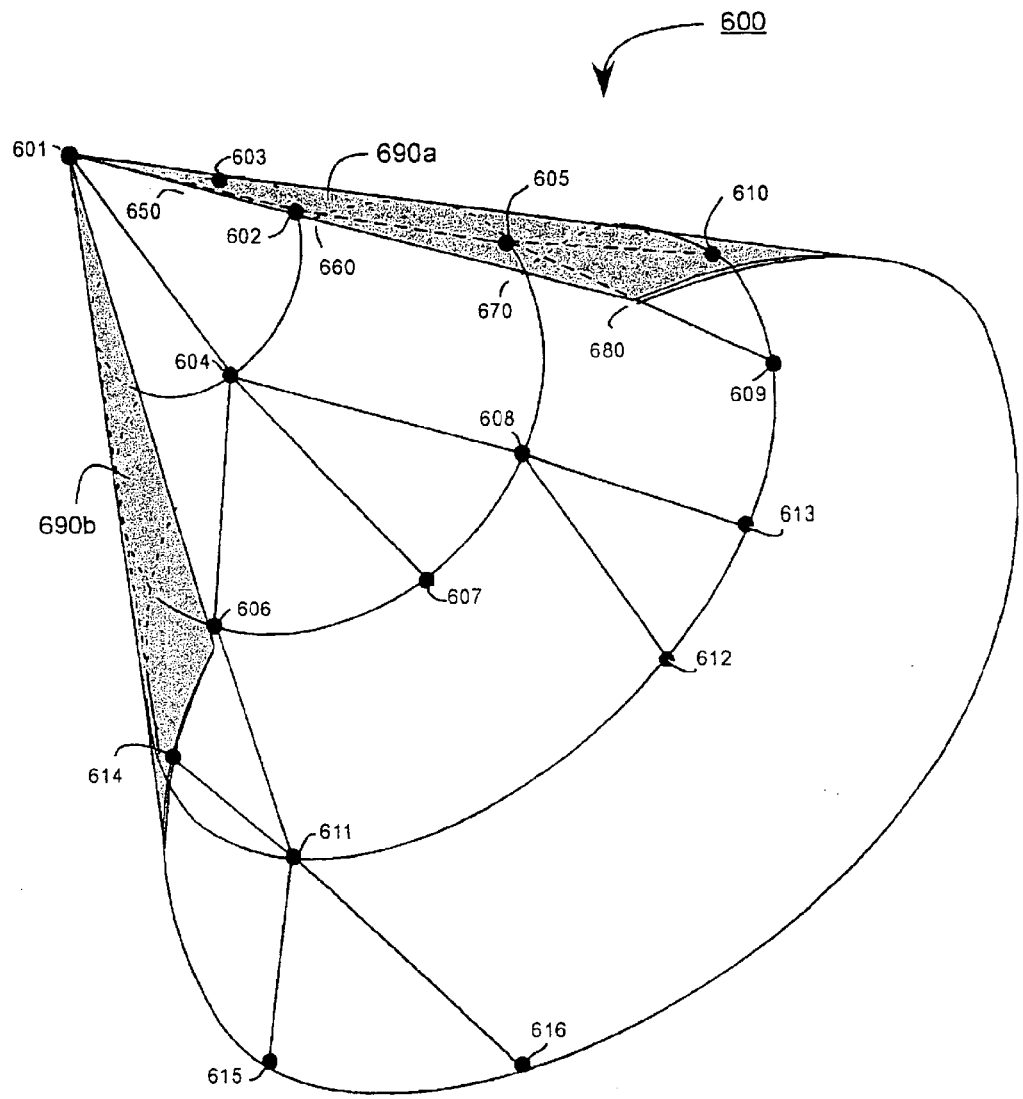
FIG. 6 illustrates a dome tree generated from the two-dimensional layout of FIG. 5, in accordance with an embodiment of the present invention.

FIG. 6 illustrates a dome tree 600 generated from the two-dimensional layout 500 of FIG. 5, in accordance with an embodiment of the present invention. In FIG. 6, each of the three-quarter circles 550, 560, 570, 580 of FIG. 5 are shifted and augmented in the third direction. (The term "third direction" is used to indicate a shifting away from a two-dimensional or x-y representation. This third direction may also be referred to herein as the z direction.) Shifting each circle in the z direction provides the three-dimensional effect of a dome tree 600. The shifted and augmented three-quarter circles are labeled 650, 660, 670, 680 in FIG. 6. Point 601, which represents the root node, corresponds to point 501 at FIG. 5, and each of points 602 through 616 represent nodes 502 through 516 of FIG. 5.

The shaded portions 690*a*, 690*b* of the dome tree 600 represent what appears to be the outside of the dome. Due to the orientation of the dome tree 600, nodes 603, 602, 605, and 610 are covered by a portion of the dome and thus not viewable through the gap in the dome tree 600. The dome tree 600 may be altered, moved, shifted, or rotated in any direction, thereby allowing an unobstructed view of every node within the dome 600. In an embodiment, the outer portion of the dome, represented as shaded areas 690*a*, 690*b* may be transparent, so that nodes covered by these portions may still be seen. Alternatively, the dome may be inverted, thereby creating an image that appears to have the nodes on the outer portion of the dome.

The dome tree 600 need not be a pure curved dome, as represented in FIG. 6. For example, the dome tree may be augmented in the z direction in a step down fashion. In a dome tree represented using step down, it appears as if each layer, or three-quarter circle is a step down into the dome. This appearance makes each layer, or depth of the tree structure more apparent when viewed on a two-dimensional monitor 104. A step down dome tree is realized by either augmenting each three-quarter circle 650, 660, 670, 680 a different distance in the z direction or increasing the size of each three-quarter circle 650, 660, 670, 680 so that the dome is not purely conical.

According to an embodiment of the present invention, the layout of graph structures is performed based upon preference information. Whereas conventional layout methods are based primarily upon either topology or content, the methods according to an embodiment of the present invention encode additional information by prioritizing (or ranking) some parameter, such as usage. These methods provide degree of interest functions for graph visualizations, thereby minimizing cognitive load.

Embodiments of the present invention address the problem of laying out large directed graphs, such as found in the world wide web, predicted access patterns and actual access patterns, so that the relevant relationships are exposed. According to an embodiment of the present invention, a usage based traversal turns a general graph into a tree. The order of traversal, order of layout, or both are chosen based upon usage data such as simple frequencies or cogitation frequencies. Using embodiments of the present invention, an Intranet view for a company can be dynamically organized.

According to an embodiment of the present invention, additional information is encoded into graph visualizations by laying out graphs based on actual or predicted usage-based information. A technique for obtaining usage based information is disclosed in co-pending U.S. patent application Ser. No. 09/062,341, entitled "Usage Based Methods Of Traversing and Displaying Generalized Graph Structures," incorporated above. For example, in information retrieval, hypertext documents are accessed in various frequencies (some are more popular than others). According to an embodiment of the present invention, the popularity of an item helps determine the priority the item will receive in the layout of the graph. By coupling the usage data and encoding it into the structural layout of the graph, changes in usage and topology can be viewed at the same time.

While the scope of the proposed invention is not limited to documents on the world wide web, the web as viewed by an administrator of a web site is used as an example to ground the concepts of the present invention. The present invention allows web administrators in charge of maintenance to understand the relationship between a web site's predicted usage patterns, actual usage patterns and its topology.

In addition to visualizing the structure and topology of a web site, an embodiment of the present invention also displays information relevant to the web site's design. For example, analysts may view actual user paths as they travel through different web pages. Viewing actual user paths assists in determining whether the site is well organized or whether users will have to go through multiple pages to reach their goal.

Another example of information which may be viewed using embodiments of the present invention is user's predicted paths through a site. A technique for predicting user paths is disclosed in co-pending U.S. patent application Ser. No. 09/540,976 entitled "System and Method for Predicting Web User Flow By Determining Association Strength Of Hypermedia Links," incorporated above. Using this technique, predicted paths are generated based on the structure of a web site, a given user information goal, and a simulation of user flow through the site to reach the goal. The simulation is performed by starting hypothetical users at different web pages, each with the same goal and predicting the paths used to reach the goal.

Viewing this information is beneficial in designing a web site to be more efficient and user friendly. For example, predicting user's paths to a given goal assists in determining whether random patterns are used to access the goal or whether a particular route is used.

Still another example of information that may be viewed using embodiments of the present invention is user's information goals. A technique for predicting user information goals is disclosed in co-pending U.S. patent application Ser. No. 09/540,063, entitled "System and Method for Inferring User Information Need In A Hypermedia Linked Document Collection," incorporated above. Using this technique, user information goals are predicted based on the structure of a web site, observed user paths, and a simulation of user flow through the site. Viewing this information is beneficial in determining the type of data that interests users. For example, if it is predicted that users are interested in the stock price of a company, a web site will be more efficient if that information is placed in a highly traveled area. Alternatively, if it is predicted that a particular product for sale is often a goal, sales may increase by making that product more accessible.

In addition to viewing actual and predicted user paths and goals, an embodiment of the present invention allows viewing of this information together. Viewing both actual and predicted information allows analysts and developers to determine whether a design based on predicted patterns is actually being followed. When viewing actual and predicted paths, the predicted paths may be displayed as bars on the dome tree. Each bar represents the likelihood that a user, given a goal, will traverse a particular path. The longer the bar, the higher the likelihood. (Throughout this document, the likelihood of traversing a path maybe referred to as the strength of a scent).

Each of the above-described techniques generate a usage log. Also, actual user logs can be generated from session logs, or cookies. Once a log has been assembled, frequently traveled user paths may be generated for layout on a visual display. Because of the complexity and sheer number of links, some information maybe filtered out to enable effective cognitive visual processing. One technique for generating frequent user paths is disclosed in co-pending U.S. patent application, Ser. No. 09/444,208, entitled "System For Predictive Modeling Using Longest Repeating Subsequences," incorporated above.

This technique takes the log, either actual or predicted, and constructs frequent user paths between nodes. For analysis purposes, highly traveled paths tend to be the most interesting. For this reason, infrequently traveled paths are filtered out. Each path and node contains usage information such as how many users have traveled along this path or through this node, where they are going, where they came from, and other related information. In an alternative embodiment, the paths generated for viewing information may be generated from the usage logs. In such an embodiment, there is no need to use a filtering technique for generating frequent user paths.

An embodiment of the present invention employs usage information to make layout decisions for a variety of layout algorithms. Some of these algorithms attempt to maximize screen real estate while others function by trying to reveal subtle relationships amongst the elements. Frequency, recency, spacing of accesses, and path information are all forms of usage information which can be referenced according to the methods of the present invention. Additionally, derived usage information like need odds and cogitation clustering can also be used, though the present invention is not limited to only these forms.

One method to layout a topology according to an embodiment of the present invention involves starting with a node, called the root node, and spreading out the links radially on three-quarter circles, about the node. The ancillary nodes then repeat until the screen real estate is consumed. To optimally layout the nodes, the layout algorithm may wish to place the highest-used nodes farthest apart from each other so that they have the most growth space. The lowest-used nodes are then placed in the remaining space between the high-usage nodes. The layout continues to place nodes the farthest apart from each other based upon usage values, around the three-quarter circles. The highest used nodes are optimally separated from each other allowing plenty of screen real estate for their related children nodes to be placed. This is done at the expense of the less used nodes.

Another layout method according to an embodiment of the present invention orders the nodes by usage and then lays them out from high to low (or low to high) to reveal popularity (or deadwood).

As an example of usage-based layout, a modified breadth first traversal of a graph according to an embodiment of the present invention encodes usage in its structure. In a traditional breadth-first traversal based layout, the immediate children of the root node are laid out, then their children. Conventionally, the order in which the children are visited is not specified in the traversal. However, according to an embodiment of the present invention, additional information is encoded into the graph layout simply by choosing a visitation order based on some parameter. For example, the visitation order is determined by sorting nodes based on the amounts of usage (favor popular web pages over less popular ones).

Figure 7:
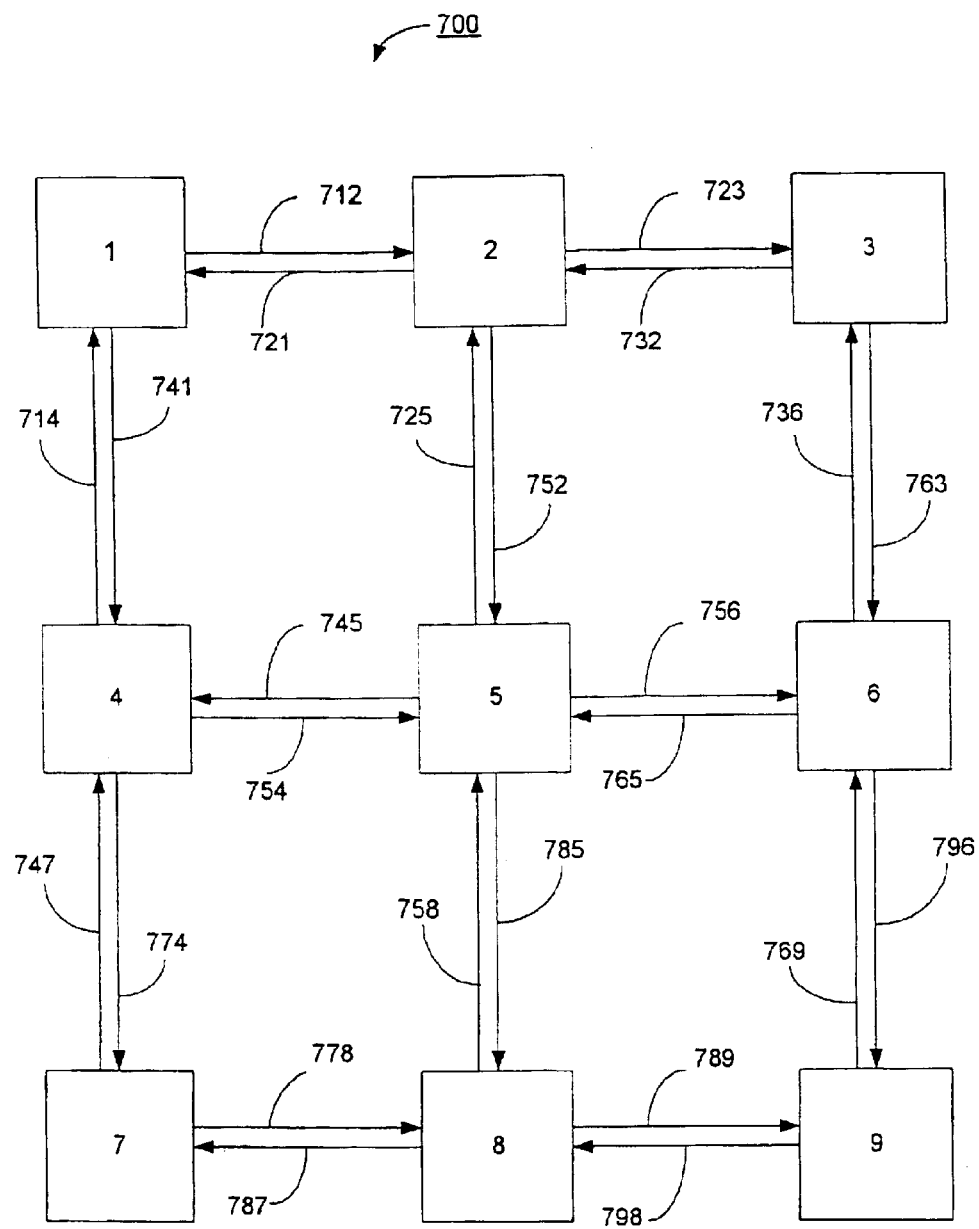
FIG. 7 illustrates a generalized graph structure having nine nodes and containing many cycles which will be used to illustrate various usage based tree structure generation methods, according to an embodiment of the present invention.

FIG. 7 illustrates a generalized graph structure having nine nodes, 1 through 9, and containing many cycles which will be used to illustrate various usage based tree structure generation methods according to an embodiment of the present invention. For the sake of clarity, bidirectional links between nodes are represented as a pair of unidirectional links. For example, node 1 has a link 712 to node 2, and node 2 has a link 721 to node 1.

FIG. 8 illustrates a topology matrix 800 corresponding to the generalized graph structure 700, according to an embodiment of the present invention. Rows 1 through 9 of the topology matrix 800 correspond to nodes 1–9, and columns 1 through 9 of the topology matrix 800 correspond to nodes 1–9. A topology matrix entry at row i and column j represents the existence or absence of a link from node i to node j. For example, node 6 has a link 763 to node 3, and node 7 has a link 778 to node 8. Thus, the existence of a link from node i to node j is represented as a 1 at row i, column j of the topology matrix 800. The absence of a link from node i to node j in the generalized graph structure 700 is represented as a 0 in the row i, column j topology matrix 800. A topology matrix is generally square, because it specifies linkages from each node to every other node in a generalized graph structure. Because the links in the generalized graph structure 700 are bidirectional, the topology matrix 800 is symmetric about its diagonal, although there is no requirement that this be the case.

Figure 9:
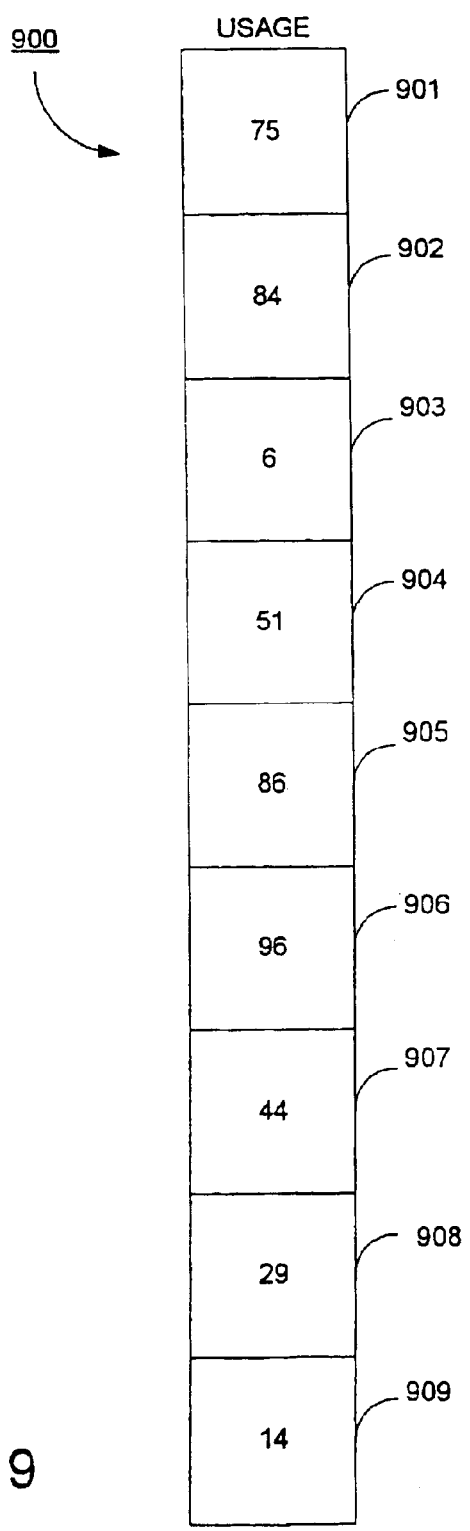
FIG. 9 illustrates a usage parameter vector pertaining to the nodes of the generalized graph structure shown in FIG. 7, according to an embodiment of the present invention.

FIG. 9 illustrates a usage parameter vector 900 corresponding to the generalized graph structure 700 shown in FIG. 7, according to an embodiment of the present invention. The usage parameter for node 1 is 75 at entry 901 of the usage parameter vector 900. Similarly, the usage parameter associated with node 8 is 29 and is found in entry 908 of the usage parameter vector 900. Thus, the usage parameter vector 900 is simply a list of usage parameters associated with each node of a generalized graph structure. Generally, an N node generalized graph structure will have an N entry usage parameter vector associated with it. The usage parameters in the usage parameter vector 900 thus correspond to measured usages of the corresponding nodes. For example, if each of nodes 1 through 9 in the generalized graph structure 900 represent web pages in a nine page web site, then the usage parameter associated with each node could be used to represent the average number of accesses per day of each particular web page in the web site. Alternatively, the user parameter associated with each node could represent the sums of the amounts of time that the various users who accessed the page kept the page open. This alternative usage parameter would encode the total dwell time measured by all users who access the page in a given fixed time period. The quantity which is encoded by the usage parameter associated with each node can be computed in a variety of separate ways, each of which measures a different type of usage. Embodiments of the present invention are applicable to any usage parameter that can be conceived and computed for each node. Therefore, the present invention is not limited to any single type of usage parameter, such as frequency or dwell time. Usage parameters are most likely normalized to some pre-defined scale. For example, the usage parameters illustrated in FIG. 9 are normalized to a scale from 0 to 100. Usage parameters could alternatively be normalized, for example, from 0 to 1, or from −1024 to +1024.

Figure 10:
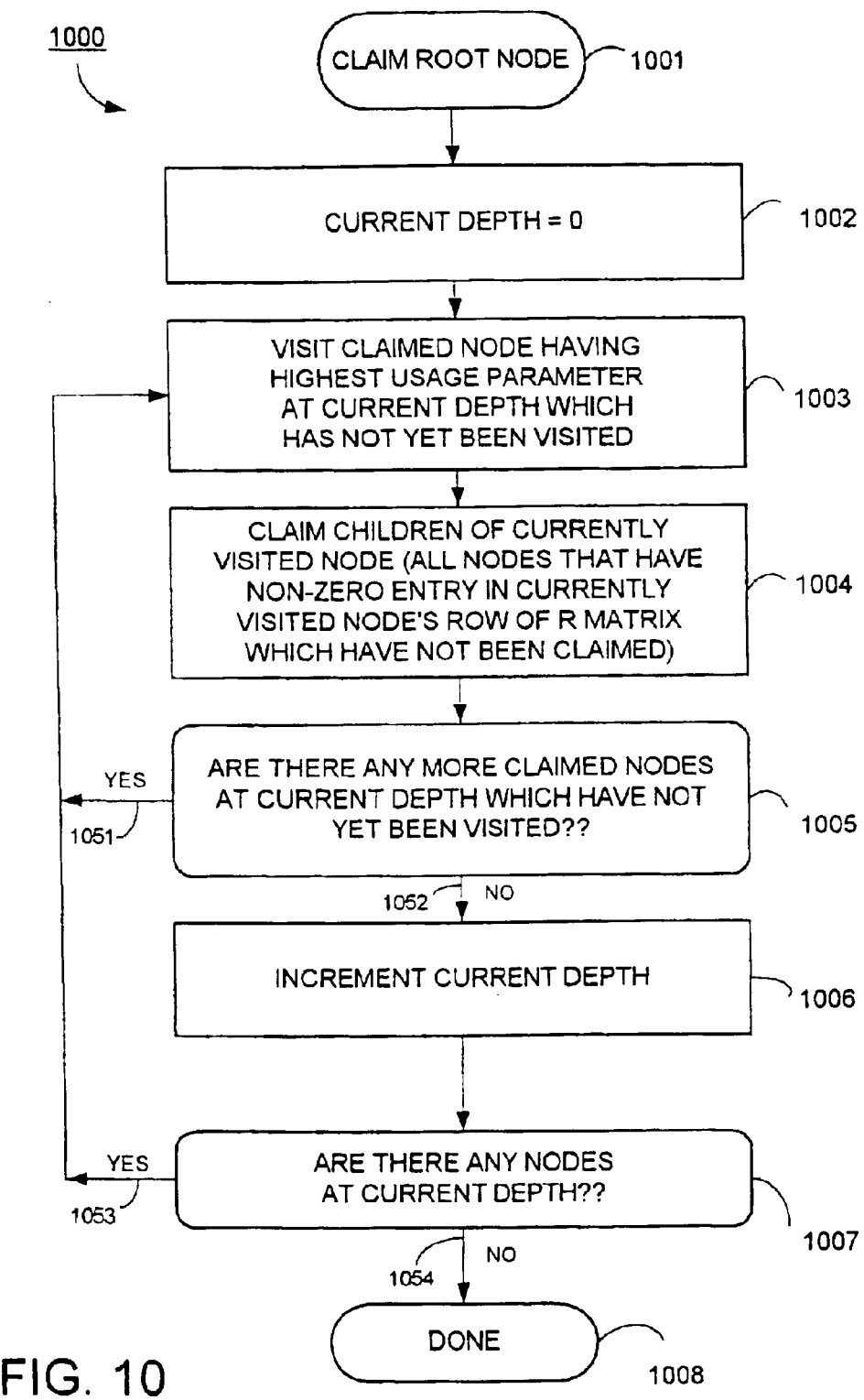
FIG. 10 illustrates a breadth first method for generating a tree structure from a generalized graph structure, according to an embodiment of the present invention.
Figure 14:
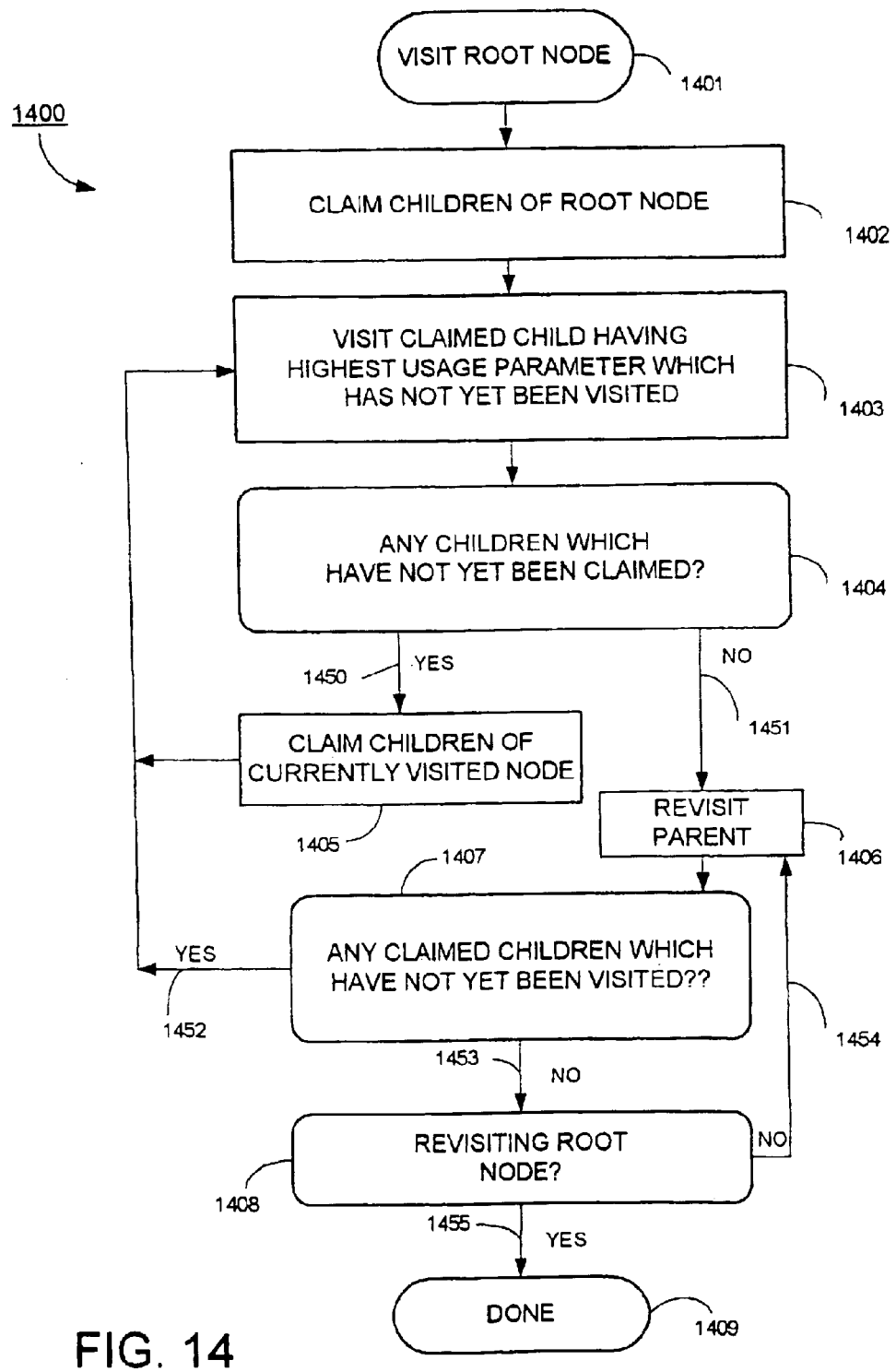
FIG. 14 illustrates a depth first method for generating a tree structure from a generalized graph structure, according an embodiment of the present invention.
Figure 18:
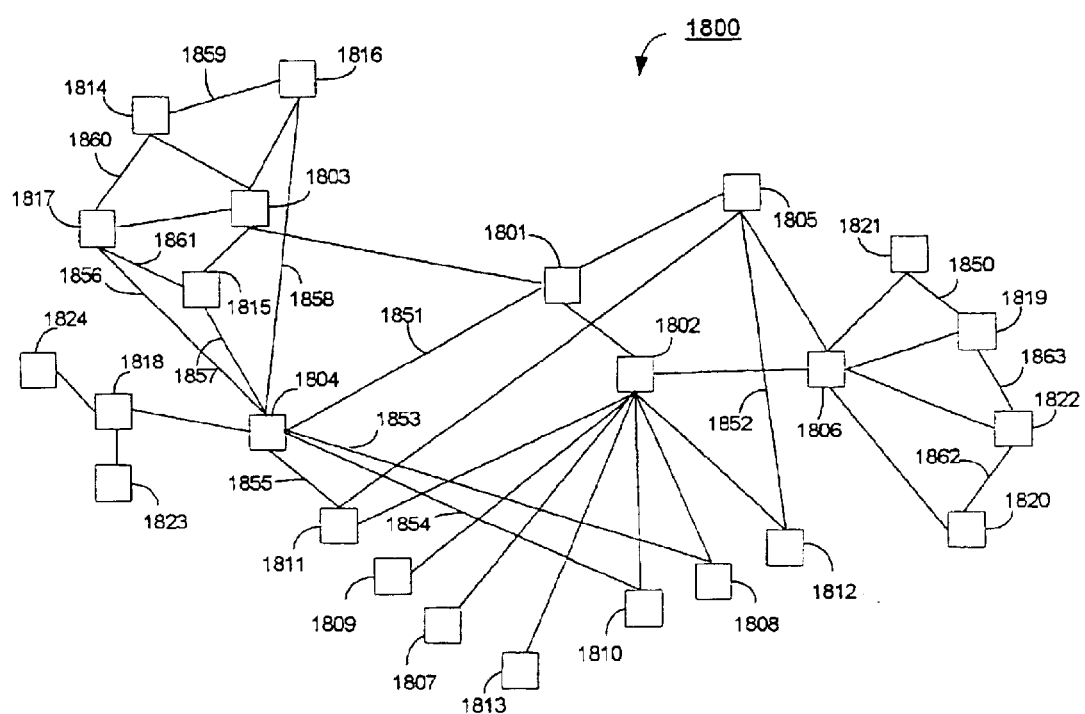
FIG. 18 illustrates another generalized graph structure, according to an embodiment of the present invention.

FIG. 10 illustrates a usage-based breadth first method 1000 for generating a tree structure from a generalized graph structure, according to an embodiment of the present invention. As one who is skilled in the art would appreciate, FIGS. 10, 14, and 18 illustrate logic steps for performing specific functions. In alternative embodiments, more or fewer logic steps maybe used. In an embodiment of the present invention, a logic step may represent a software program, a software object, a software function, a software subroutine, a software method, a software instance, a code fragment, a hardware operation or user operation, singly or in combination.

In an embodiment of the present invention, the software methods illustrated by FIGS. 10, 14, and 18 may be stored in an article of manufacture, such as a computer readable medium. For example, the software may be stored in a magnetic hard disk, an optical disk, a floppy disk, CD-ROM (Compact Disk Read-Only Memory), RAM(Random Access Memory), ROM (Read-Only Memory), or other readable or writeable data storage technologies, singly or in combination.

The method 1000 begins at step 1001 with the claiming of a root node. In order to generate a tree structure by a breadth first algorithm, the root node must be specified so that the depth of any node can be calculated relative to the root node. The claiming of the root node in step 1001 can occur by a variety of mechanisms. For example, a user may place his cursor on a specific node of a generalized graph structure displayed on a computer monitor using his cursor control device and then select the node by pressing a button on the mouse 105. Alternatively, the root node may be claimed by implication from its node name. For example, in a web site, the web home page may have a URL (universal resource locator) which has a semantic structure which indicates that it must be the root node. For example, Xerox Corporation's home web page located at URL www.xerox.com may be parsed by a program implementing the methods according to an embodiment of the present invention, and this program may recognize that this web page is the root node of the web site to which the program is being applied by virtue of the name of the node. In any case, once a root node is specified at step 1001, the current depth is set to zero at step 1002. Step 1002 merely specifies that the depth of the root node is, by definition, zero. This definition was illustrated in the tree structure 400 in FIG. 4 relative to the root node 201 at depth zero. At step 1003, the method visits the claimed node having the highest usage parameter associated with it, which is at the current depth and which has not yet already been visited. When this step 1003 is encountered for the first time during an execution of the method 1000, the only node which will have been claimed is the root node, and the root node will also be the only node which exists at the current depth, and it will have not yet been visited. Therefore, the first time that step 1003 is encountered in the method 1000, the root node is visited.

At step 1004, the method claims all children of the currently visited node, which have not already been claimed. The nodes which are claimed in step 1004 can be easily identified by referring to the topology matrix and usage parameter vector. The children which should be claimed at step 1004 are those nodes which have nonzero entries in the visited node's row of the topology matrix which have not already been claimed.

At step 1005, the method 1000 determines whether or not there are any additional claimed nodes at the current depth which have not yet been visited. The first time that step 1005 is encountered in the method 1000, the answer to the test presented in 1005 will be no, because the only node at the current depth of zero is the root node itself. Therefore, branch 1052 takes the method to step 1006 where the current depth is incremented. The first time that step 1006 is encountered in the method 1000, the current depth will be set to one.

At step 1007, the method 1000 determines if there are any nodes at the current depth (which was just increased). In other words, test 1007 determines whether or not all nodes in the generalized graph structure have been both claimed and visited. If there are no nodes at the current depth, then all nodes have been claimed and visited and branch 1054 takes the method to completion at step 1008. However, assuming that there are nodes at the newly incremented current depth, branch 1053 takes a method back to step 1003. At step 1003, the claimed node having the highest usage parameter at the current depth is visited. In other words, for all nodes which have been claimed that are at the current depth, the usage parameter is referenced from the usage parameter vector, and the claimed node having the highest usage parameter is selected first for visitation.

Steps 1003, 1004, and 1005 are repeated for each claimed node in order of decreasing usage parameter associated with the claimed nodes at the current depth. The method 1000 continues until all nodes have been claimed and visited, and then the method is done at step 1008.

Figure 11:
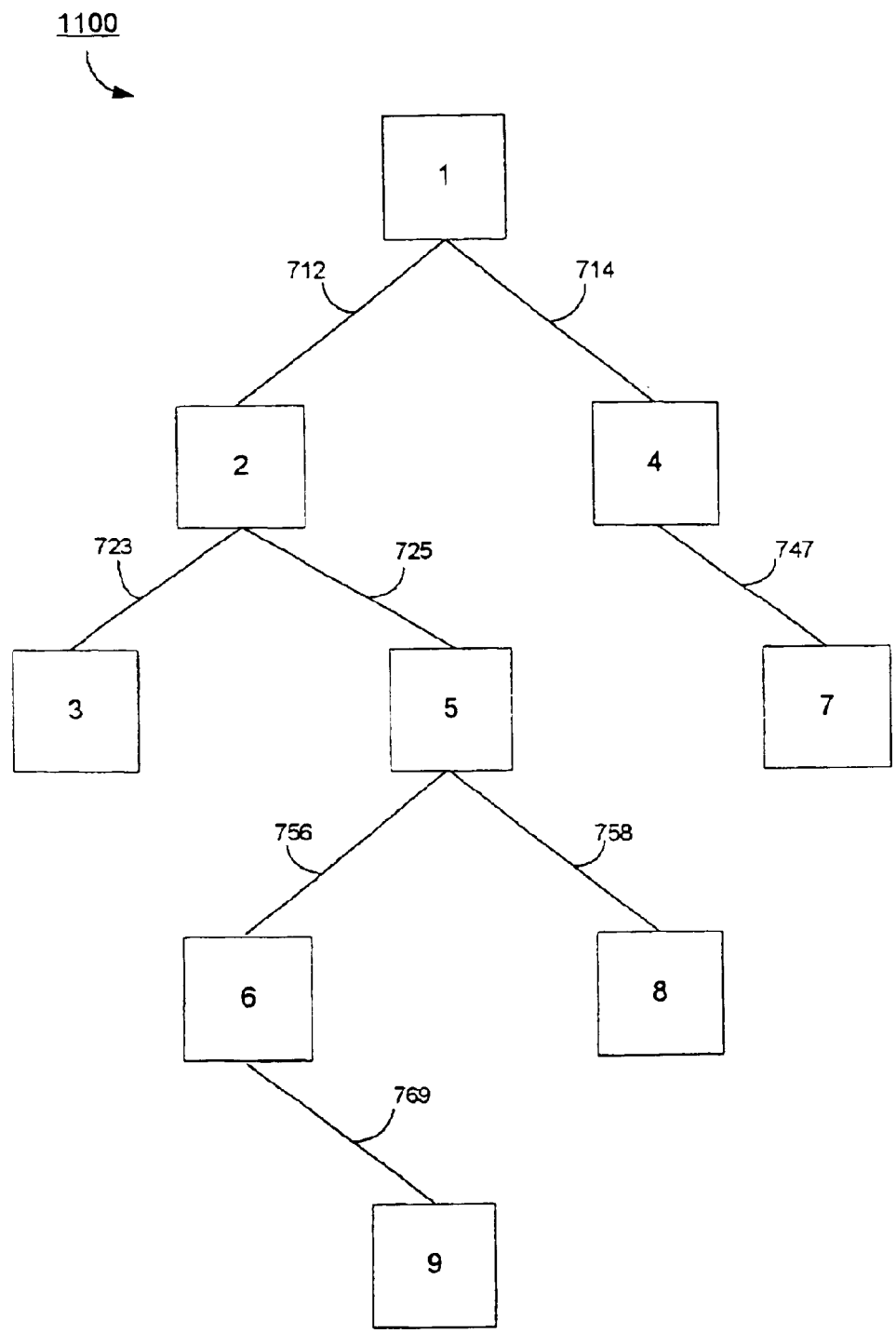
FIG. 11 illustrates a tree structure generated from the generalized graph structure shown in FIG. 7 by the breadth first method shown in FIG. 10 using the node usage parameter vector shown in FIG. 9, according to an embodiment of the present invention.

FIG. 11 illustrates a tree structure generated from the generalized graph structure 700 shown in FIG. 7 by the breadth first method 1000 shown in FIG. 10 and making reference to the usage parameter vector 900 shown in FIG. 9, according to an embodiment of the present invention. In the tree structure 1100 shown in FIG. 11, the user specified node 1 as the root node and nodes 2 and 4 were claimed as the root node's children. After the depth had been incremented to 1, node 2 was visited prior to node 4 because node 2's usage parameter (found in entry 902 of the usage parameter vector) was larger than the usage parameter corresponding to node 4 found at entry 904 of the usage parameter vector 900. Specifically, node 2's usage parameter was 84 while node 4's usage parameter was 51, therefore node 2 was selected for visitation first, since 84 is greater than 51. When node 2 is visited, nodes 3 and 5 were claimed as children of node 2. When node 4 was visited at depth equals one, it claimed node 7 as its child. Then all nodes at depth one had been visited, so the method 1000 incremented the depth to two, and node 5 was selected for visitation prior to nodes 3 and 7 because node 5's usage parameter of 86 (found in entry 905 of the usage parameter vector 900) was greater than node 3's usage parameter of 6 and node 7's usage parameter of 44. When node 5 was visited, the method 1000 claimed nodes 6 and 8 as node 5's children. Then node 7 was visited, but there were no children that could be claimed for node 7. Similarly, node 3 was visited at depth 2, but it could claim no children. So the depth was incremented to 3, and node 6, having usage parameter 96, was visited, and node 9 was claimed as the child of node 6. Node 8 at depth 3 and node 9 at depth 4 could not claim any children when they were visited. After node 9 was visited, the current depth was incremented to five, but the method 1000 determined at step 1007 that no nodes existed at this depth, so branch 1054 ended the method 1000 at step 1008.

FIG. 12 illustrates a usage parameter matrix 1200, according to an embodiment of the present invention. The usage parameter matrix 1200 includes usage parameters pertaining to each of the links in the generalized graph structure 700 shown in FIG. 7. The usage parameters found in the usage parameter matrix 1200 specify the amount of measured usage of each of the links shown in the generalized graph structure 700 shown in FIG 7. For example, the amount of usage of link 752, which provides a path from node 5 to node 2, is 28. In general, the usage parameter associated with the link from node i to node j is specified by the usage parameter found in row i, column j of the usage parameter matrix 1200. As another example of how the method 1000 can be applied to a different measure of usage, the link usage parameters found in the usage parameter matrix 1200 can be referenced instead of the usage parameters found in the usage parameter vector 900 to determine the order of visitation at step 1003. In other words, the usage parameter's associated with links pointing to the claimed children at a node may be referenced as the usage parameter determining the order of visitation of nodes at the same depth. If the link usage parameters shown in usage parameter matrix 1200 a remodeling usage of hyperlinks in a nine page web site, then this example is concerned with the hyper link usage rather than usage of any other individual web pages.

Figure 13:
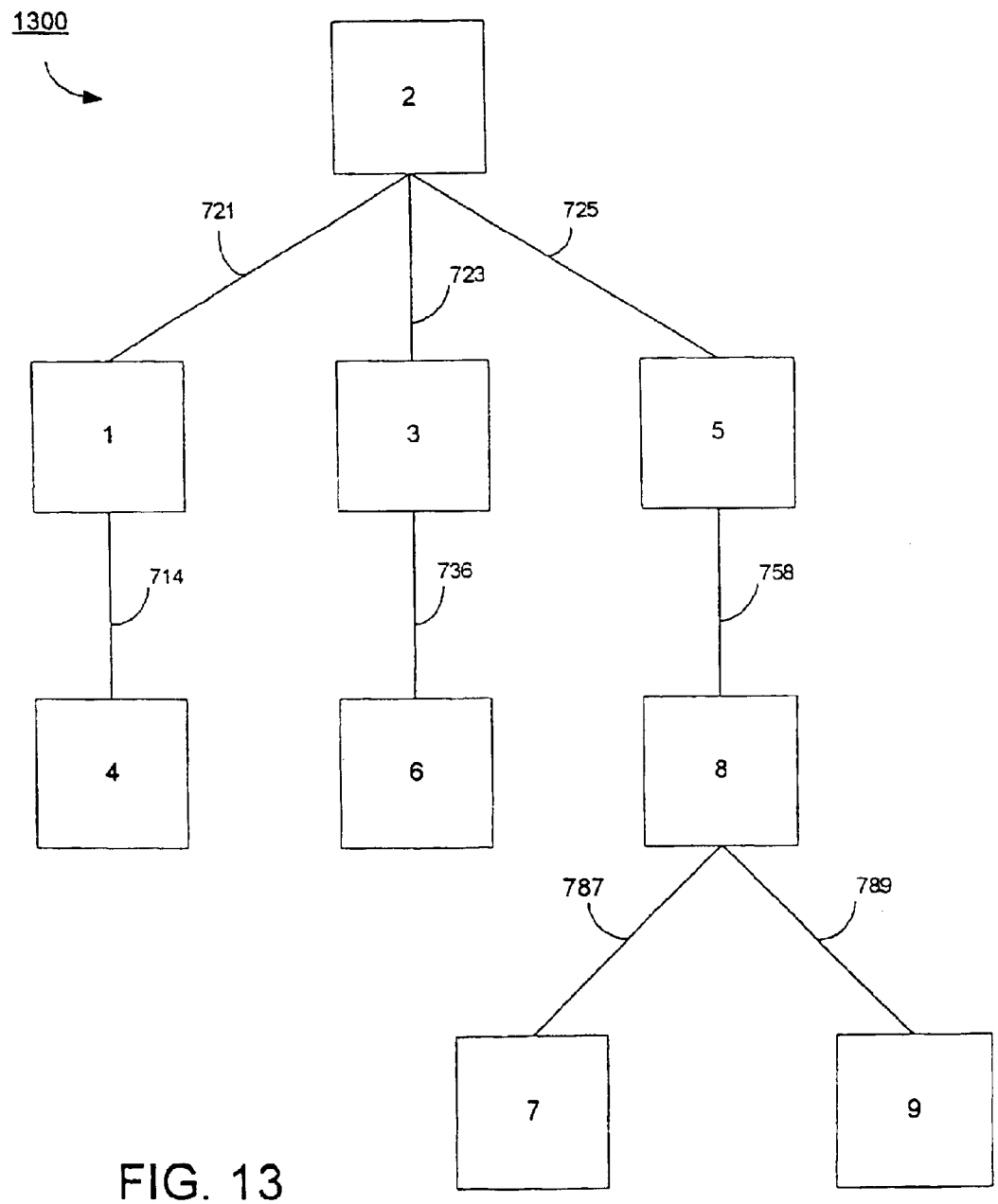
FIG. 13 illustrates a tree structure generated from the generalized graph structure shown in FIG. 7 by the breadth first method shown in FIG. 10 using the link usage parameter matrix shown in FIG. 12, according to an embodiment of the present invention.

FIG. 13 illustrates a tree structure 1300 generated from the generalized graph structure 700 using the usage parameter matrix 1200 by the method 1000, according to an embodiment of the present invention. In the tree structure 1300 shown in FIG. 13, the user has selected node 2 as the root node, nodes 1, 3, 5 were claimed as children of the root node 2, and node 3 at depth 1 was visited first because the usage parameter corresponding to links 723 from node 2 to node 3 has a usage parameter of 74, which is greater than the usage parameter of link 721 and the usage parameter of link 725. When node 3 was visited, it claimed node 6 as its child, and then node 1 was visited at depth 1. Node 1 claims node 4 as its child and then node 5 at depth 1 was visited. Node 5 claims node 8 as its child, and node 8 at depth 2 was visited first because the usage parameter associated with link 758 was greater than the usage parameter associated with link 736 and greater than the usage parameter associated with link 714. Thus, when node 8 was visited, it claimed node 7 and 9.

Embodiments of the present invention may use any usage parameter to determine the ordering of visitation. For example, although node-based and link-based breadth first traversal algorithms have been disclosed, there is no requirement that the method according to an embodiment of the present invention use these specific usage parameters or this specific breadth first algorithm. For example, the usage parameter associated with each node could be a weighted linear function of the node usage parameter (such as shown in the usage parameter vector 900) and the link usage parameter (such as shown in the usage parameter matrix 1200) to generate a derived usage parameter. Furthermore, the products of the link and node usage parameters could be computed and used as the usage parameter, which determines the node visitation order in step 1003. As another example, the products of link usages from the root to a given node could be computed and used as the given node's usage parameters for determination of ordering of visitation at step 1003. Moreover, the method 1000 illustrated in FIG. 10 is only an example of a usage-based breadth first method that can be employed according to the present invention. Alternatively, the method 1000 could be modified so that all sibling nodes of the currently visited node are visited prior to visiting cousin nodes or distantly related nodes that are at the same depth.

FIG. 14 illustrates a usage-based depth first method of generating a tree structure from a generalized graph structure, according to an embodiment of the present invention. After a root node has been identified, at step 1401 the root node is visited, and the children of the root node are claimed at 1402. At step 1403, the method visits the claimed child having the highest usage parameter which has not yet been visited. At step 1404, the method determines whether or not the currently visited node has any children which have not yet been claimed. If unclaimed children exist, branch 1450 claims those children and then step 1403 visits the claimed child having the usage parameter which has not yet been visited. In other words, steps 1403, 1404, and 1405 are performed until the end of a lineage of children has been reached. When a node is reached that has no children which have not yet been claimed, branch 1451 takes the method 1400 to step 1406, where the parent of the currently visited node is revisited. At step 1407, the method 1400 determines whether or not the currently visited node has any claimed children which have not yet been visited. If claimed children exist which have not yet been visited, branch 1452 takes a method back to step 1403. However, if there are no claimed children which have not yet been visited, then branch 1453 takes a method 1400 to step 1408. At step 1408, the method 1400 checks to see whether or not the root node is being revisited. If the method 1400 is not revisiting the root node, then branch 1454 takes a method 1400 back to step 1406 where the parent of the currently visited node is revisited. If step 1408 determines that the method 1400 is revisiting the root node, branch 1455 takes the method 1400 to completion at step 1409.

Essentially, the usage-based depth first method 1400 according to an embodiment of the present invention visits as many nodes in a linked lineage as it can until it reaches a leaf node. When the method 1400 reaches a leaf node, step 1406 sends the method 1400 back to the leaf node's parent, so that other children of the leaf node's parent can be visited. Essentially, any visited node's entire descendent sub tree will be claimed and visited before any of its siblings are visited.

Figure 15:
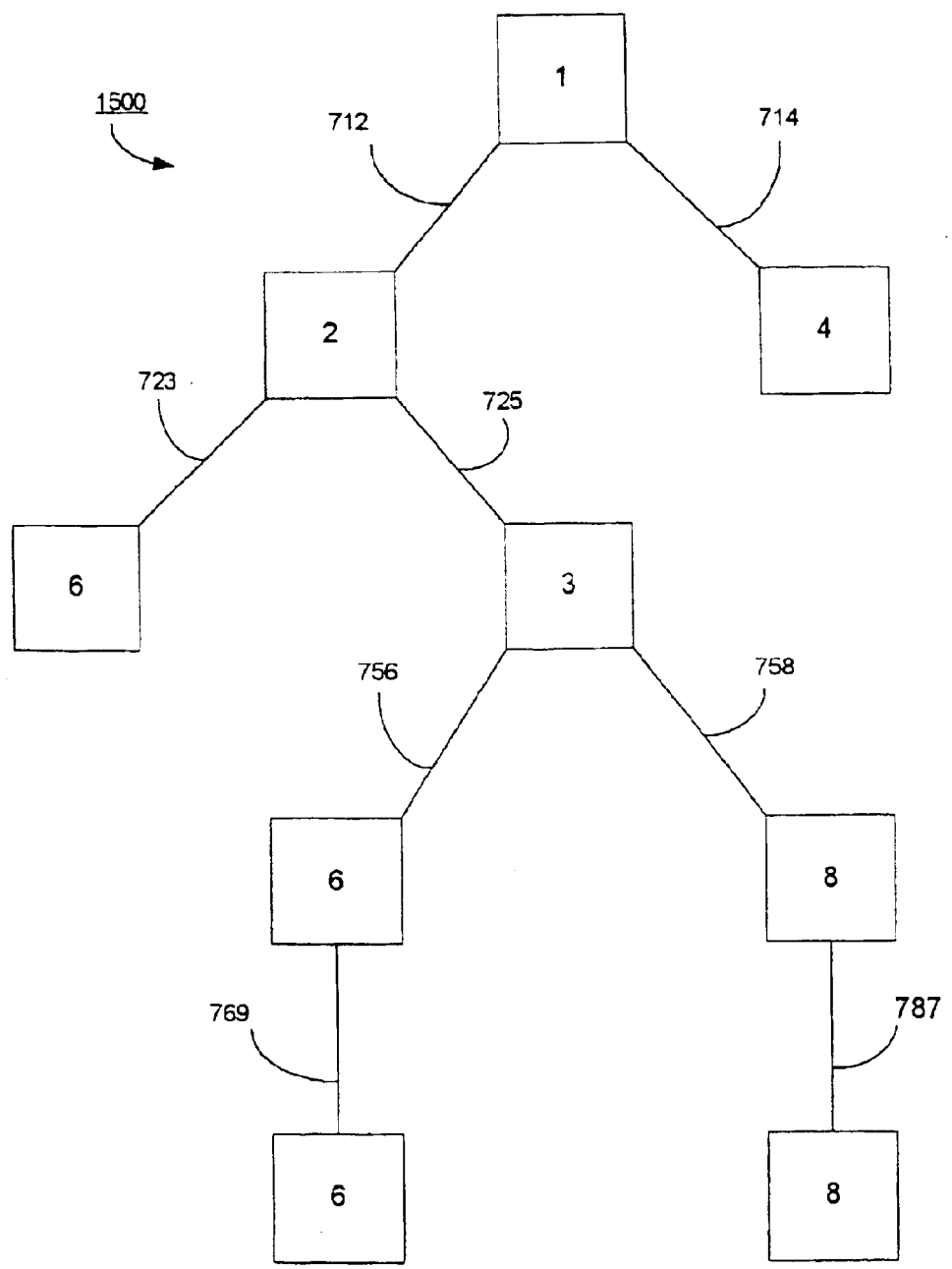
FIG. 15 illustrates a tree structure generated from the generalized graph structure shown in FIG. 7 by the depth first method shown in FIG. 14 using the node usage parameter vector shown in FIG. 9, according to an embodiment of the present invention.

FIG. 15 illustrates a tree structure 1500 generated from the generalized tree structure 700 using the usage parameter vector 900 shown in FIG. 9 by the depth first method 1400, according to an embodiment of the present invention. Node 1 is the root node of the tree structure 1500. Nodes 2 and 4 are claimed as children of node 1, and node 2 is visited before node 4 because node 2's usage parameter is higher than node 4's usage parameter. When node 2 is visited, nodes 3 and 5 are claimed as its children. Then node 5 is visited because node 5's usage parameter is higher than node 3's usage parameter. When node 5 is visited, node 6 and 8 are claimed as its children. Then, node 6 is visited because node 6's usage parameter is higher than node 8's usage parameter. When node 6 is visited, node 9 is claimed as its child, and then node 9 is visited. When node 9 is visited, step 1404 determines that there are no children which can be claimed by node 9, so step 1406 dictates that node 6 is revisited, and step 1407 determines that there are no more claimed children of node 6 which have not yet been visited. So then branch 1453 takes the method to step 1408 which determines that node 6 is not the root node. So then branch 1454 takes the method back to step 1406 where node 6's parent is revisited. At this point in the method 1400, node 5 is being revisited. Step 1407 determines that there is a claimed child of node 5 which has not yet been visited, namely node 8. Thus, branch 1452 takes method 1400 back to step 1403 where node 8 is visited. When node 8 is visited, node 7 is claimed as its child. When node 7 is visited, step 1404 determines that there are no children which node 7 can claim, so step 1406 dictates that node 8 be revisited. Then after going through steps 1407 and 1408, step 1406 again takes the method back to node 5, and another loop through steps 1407 and 1408 takes the method back to node 2. Then node 3 is visited, node 2 is then revisited, and then the root node 1 is revisited. After step 1406 has dictated that the root node 1 be revisited, step 1407 determines that there is a claimed child of the root node 1, which has not yet been visited, namely node 4. Thus, branch 1452 take the method back to step 1403 and node 4 is visited. However, step 1404 determines that there are no children which node 4 can claim, therefore branch 1451 takes a method back to step 1406, so that the root node is again revisited. This time, step 1407 determines that all claimed children of the root node have been visited, so branch 1453 takes a method to step 1408, which determines that the method 1400 is revisiting the root node and then branch 1455 takes the method to completion as step 1409.

The various variations of usage parameters used for determining the order of visitation of children nodes in the depth first method 1400 according to an embodiment of the present invention are available as discussed above relative to the usage-based breadth first method 1000. Specifically, link usage, node usage, linear or non-linear functions of link and node usage, path usage, as represented by functions of each link from the root to a give node, and a variety of other usage parameters may be employed using the method 1400 illustrated in FIG. 14. Moreover, slight variations of the usage-based depth first method 1400 may be implemented according to an embodiment of the present invention.

There are a variety of ways according to embodiments of the present invention that this usage-based display can be accomplished. For example, each sibling may be allocated a constant amount of angular space based upon the total number of siblings, and then the highest used half of the siblings may be plotted to achieve optimal separation from each other based upon usage, and then the lowest used half of the siblings may be laid out so as to bisect the angles formed by the highest half of the nodes as described above. In the alternative, the highest usage nodes can always be placed 180° from each other and angular space between already laid out adjacent nodes can be divided by two each time a new node is laid out, even if the number of siblings is not an exact power of two.

Figure 16:
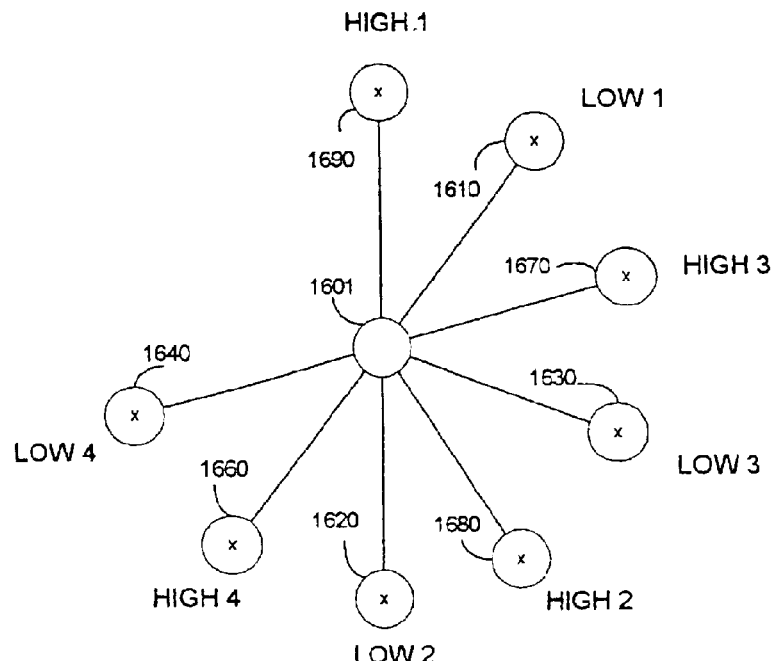
FIG. 16 illustrates node placement according to the present invention for display of sibling nodes relative to their parent at layout angles such that highest ranking sibling nodes ranked by their usage parameters are optimally separated, according to an embodiment of the present invention.

FIG. 16 illustrates a manner of laying out a display of a tree structure radially on a three-quarter circle about a parent node 1601, according to an embodiment of the present invention. Nodes 1610, 1620, 1630, 1640, 1660, 1670, 1680, and 1690 are children of parent node 1601. For convenience, the reference numerals have been assigned such that they are monotonically related to the usage parameter of the sibling nodes. For example, node 1690 has a higher usage parameter than node 1680. The lowest usage node is node 1610. In FIG. 16, the highest used nodes are separated optimally from each other, at the expense of lesser used nodes. Thus, node 1690 (the highest usage node) is placed 135° away from node 1680 (the second highest used node). After the four highest used nodes 1690, 1680, 1670 and 1660 are placed so as to form four like angles, the lowest used node is placed so as to bisect the angle formed by the two adjacent nodes having the highest total usage.

At this point, it is useful to consider the rankings of sibling nodes when sorted by their usage parameters. Node 1690 ranks 1 and node 1610 ranks 8. Once the highest used half of the siblings have been laid out, the lowest used half of the siblings can be laid out such that the lowest used node is placed so as to bisect the angle formed by the two adjacent siblings which have the lowest sum of their rankings. For example, node 1690 (which ranks one) and node 1670 (which ranks three) have a sum of rankings which equals four, and that ranking is the lowest ranking (indicating highest usage) of any of the angles formed by the four highest usage nodes. Thus, the lowest used node 1610 is placed so as to bisect nodes 1690 and 1670. The next lowest usage node, namely node 1620 is placed so as to bisect the next two highest used nodes, 1660, 1680. The remaining members of the lowest used half of the nodes are laid out similarly so as to bisect angles formed by nodes which are among the highest usage half of the sibling nodes.

Figure 17:
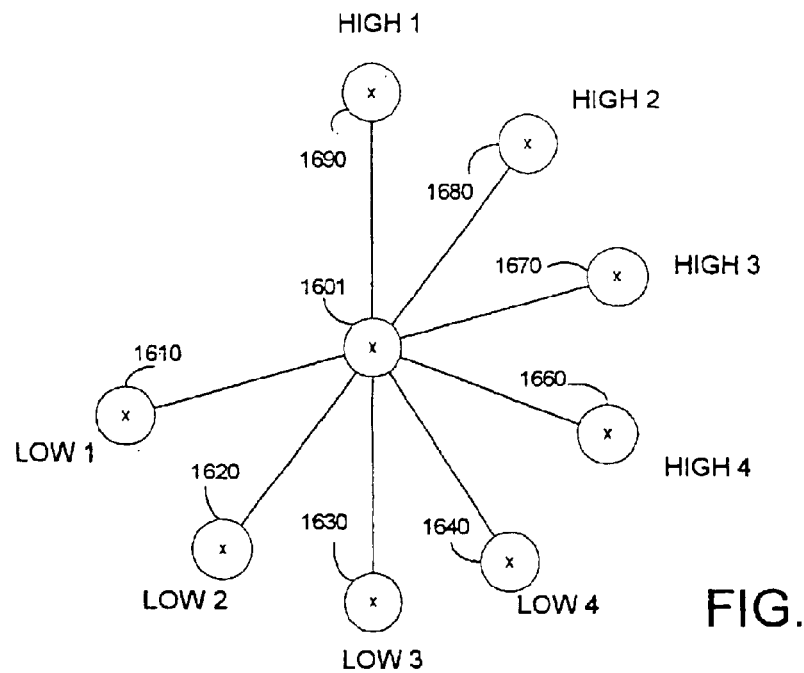
FIG. 17 illustrates node placement according to the present invention for display of sibling nodes relative to their parent at layout angles that increase monotonically with the ranking of the sibling nodes ranked by their usage parameters, according to an embodiment of the present invention.

FIG. 17 illustrates another method according to an embodiment of the present invention of laying out a group of sibling nodes for display using their usage parameters to determine their placement about their parent node 1601. In this method, a certain angle is specified as the angle at which the highest usage node 1690 will be placed. The 270° of the three-quarter circle is divided by the total number of sibling nodes. The highest usage node 1690 is placed at the specified angle designated for, and then the remaining nodes 1680, 1670, 1660, 1640, 1630, 1620, and 1610 are placed so as to be adjacent to the next highest usage node relative to them. Thus, the highest usage node 1690 is placed at the specified angle, and the second highest usage node 1680 is placed adjacent to the highest usage node, the third highest usage node 1670 is placed adjacent to the second highest usage node 1680, and so forth, until the lowest usage node 1610 is laid out. Thus, the angular placement of each node is monotonically related to its layout angle relative to its parent.

FIG. 18 illustrates a generalized graph structure 1800 consisting of twenty-three nodes, 1801 through 1824, according to an embodiment of the present invention. By picking node 1801 as the root and performing a breadth first traversal of the generalized tree structure 1800, links 1850 through 1863 are eliminated so as to eliminate cycles and thereby create a tree structure.

Figure 19:
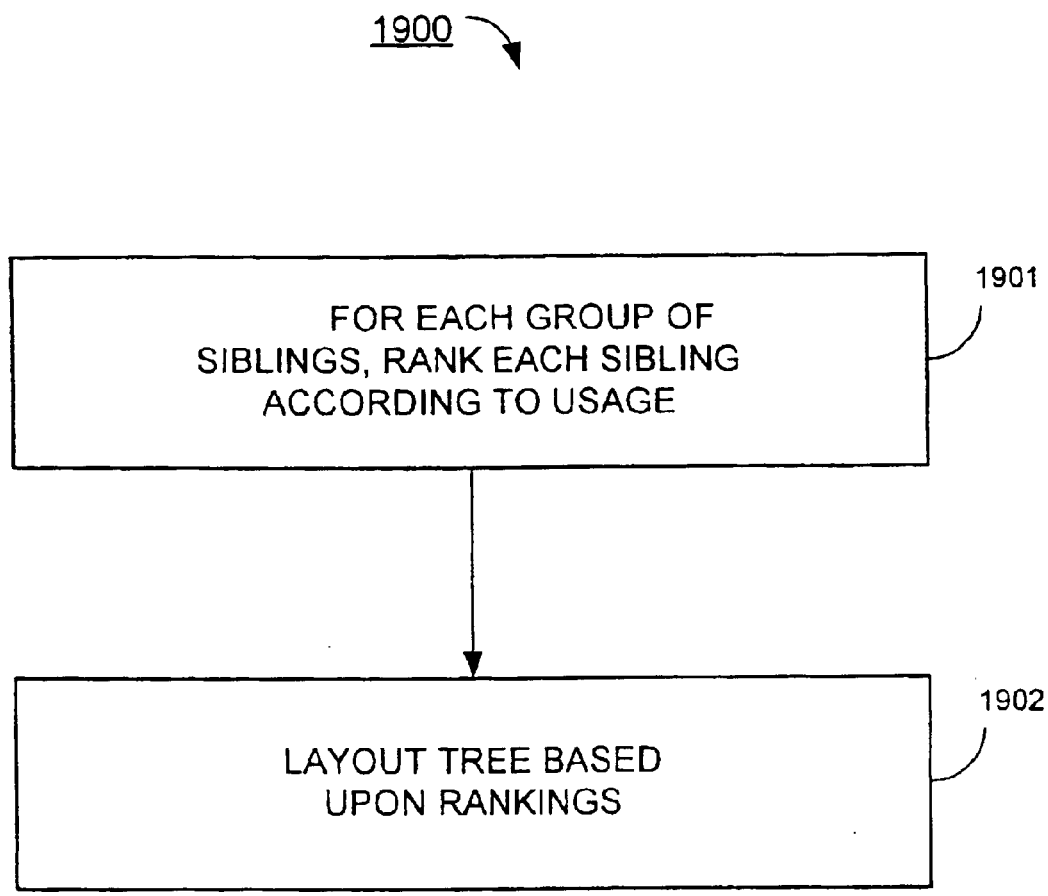
FIG. 19 illustrates a method of displaying a tree structure based upon usage, according to an embodiment of the present invention.

FIG. 19 illustrates a method of laying out a tree structure using usage rankings, according to an embodiment of the present invention. At step 1901, for each group of siblings in the tree structure, each sibling is ranked according to its usage parameter. At step 1902, the tree structure is laid out based upon the rankings of all the sibling groups within the tree structure.

Figure 20:
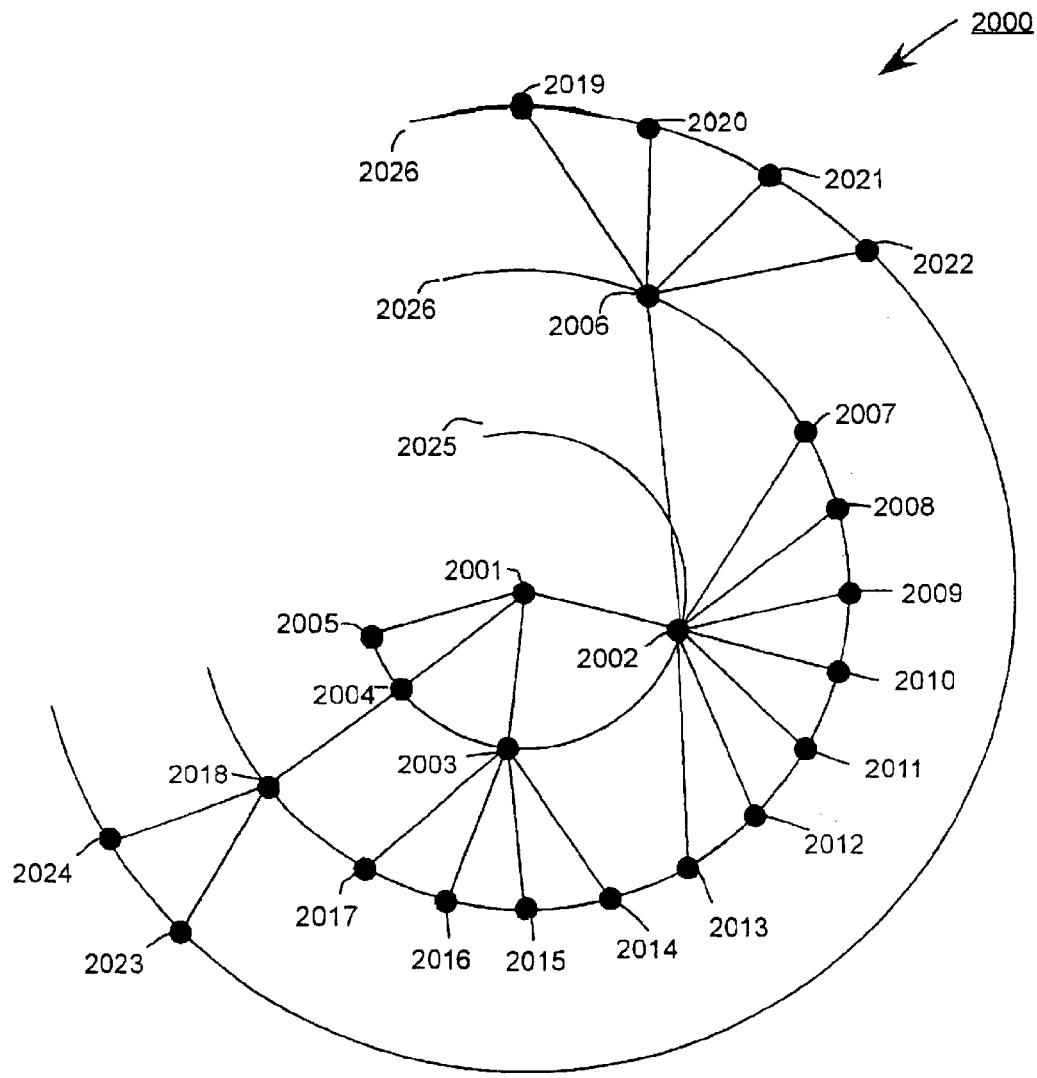
FIG. 20 illustrates a two-dimensional tree representation of the generalized graph structure shown in FIG. 17 which may be used in generating a dome tree, according to an embodiment of the present invention.

FIG. 20 illustrates a two-dimensional representation of the tree structure generated from the generalized graph structure 1800 shown in FIG. 18, which maybe used for generating a dome tree, according to an embodiment of the present invention. In FIG. 20, each level, or depth of the tree is represented using a three-quarter circle 2025, 2026, 2027. In an embodiment, at each level the nodes are placed in a clockwise orientation around the three-quarter circle based on their usage. For example, node 2002 is the highest usage node at depth 1, node 2003 is the next highest usage node at depth 1, and node 2005 is the least used node of depth 1. Thus, when the dome tree is generated, the user has a direct view of the most used nodes when viewing the inside of the dome through the removed portion. From among siblings 2006 through 2013, node 2006 is the highest usage and node 2013 is the lowest usage. As described above with reference to FIG. 5, each leaf node is assigned a constant amount of angular space in the layout of FIG. 20. Since there are 18 leaf nodes in the layout, each is assigned 15° of angular space. The layout of FIG. 20 measures the layout angle for each child node from the center of the layout of the tree structure.

Figure 21:
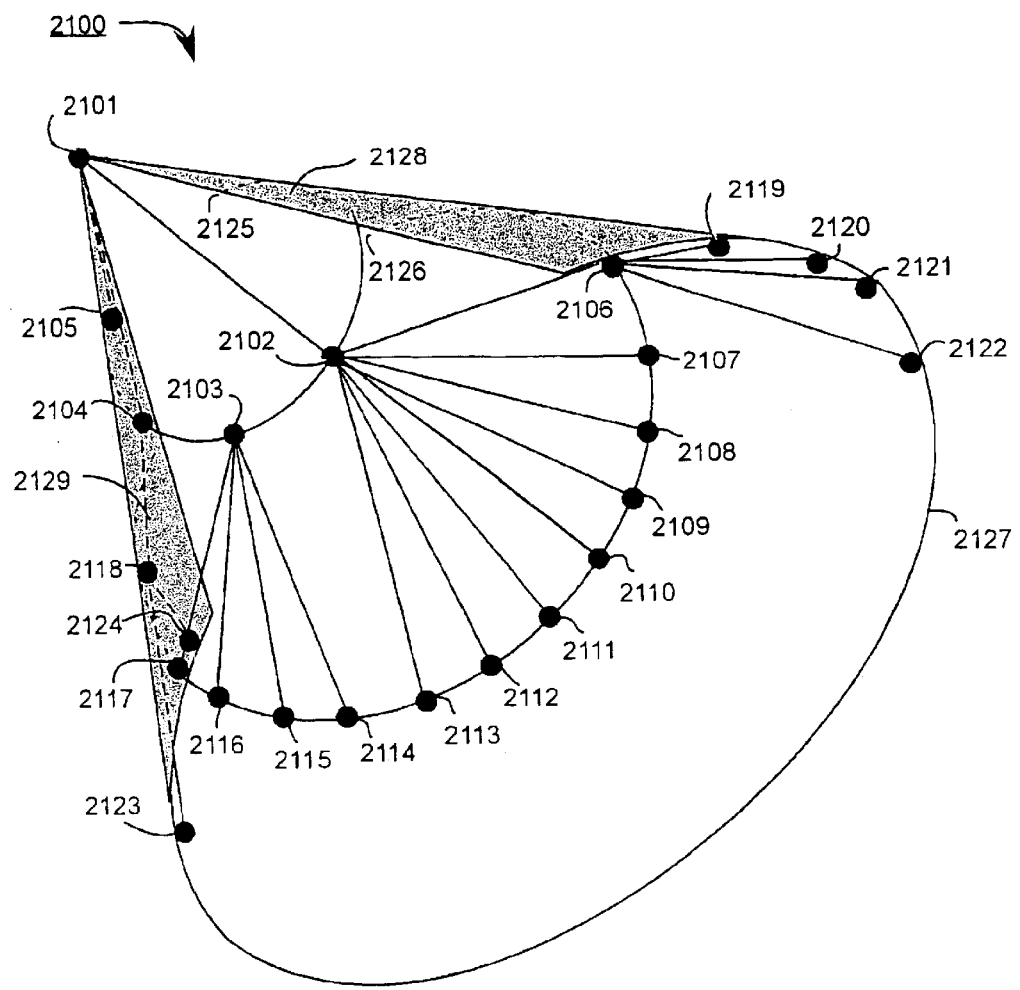
FIG. 21 illustrates a dome tree representation of the two-dimensional tree representation shown in FIG. 20 displayed, in accordance with an embodiment of the present invention.

FIG. 21 illustrates a dome tree generated from the two-dimensional layout of the tree structure of FIG. 20, according to an embodiment of the present invention. In FIG. 21, Each three-quarter circle 2025, 2026, 2027 of FIG. 20 is shifted and augmented in the z direction to provide the three dimensional effect of a dome tree 2100. The shifted and augmented three-quarter circles are labeled 2125, 2126, 2127 in FIG. 21. Point 2101, which represents the root node, corresponds to point 2001 of FIG. 20, and each of the points 2101 through 2124 represent nodes 2001 through 2024 of FIG. 20, respectively. The dome tree 2100 is positioned so that the highest usage node, 2102 is viewable through the opening in the dome tree. The shaded portions 2128, 2129 of the dome tree 2100 represent what appears to be the outside of the dome. Due to the orientation of dome tree 2100, nodes 2104, 2105, 2117, 2118 are covered by a portion of the dome and thus not immediately viewable through the gap in the dome tree 2100. The dome tree 2100 maybe altered, moved, shifted, or rotated in any direction, thereby allowing an unobstructed view of every node within the dome. In an embodiment, the outer portion of the dome, represented as shaded areas 2128, 2129 maybe transparent, so that nodes 2104, 2105, 2117, 2118 can be viewed through the dome. Alternatively, the dome may be inverted thereby created an image that appears to have the nodes on the outer portion of the dome.

The cursor control device 105 can be used to poke around at different nodes. When the cursor is over a node, that node is highlighted. In addition, a small information area shows the details on that node. The details may include, among other things, the nodes URL, frequency of usage, download time, type of information, keywords, history paths, and future paths. This interaction is like brushing the user's finger through the dome tree, seeing the detail of the point of interest. While poking around with the mouse 105, a user can also instruct the program to notify a browser (such as Netscape) to bring up that particular page, thereby making the present invention a web-surfing tool.

When the mouse 105 is activated on a particular node, that node is highlighted orange, user paths traveling into that node "history paths" are shown using blue lines, and the user paths traveling out of that node "future paths" are shown using yellow lines. As will be understood, the colors assigned above are only examples of different possibilities of indicating information. Such information maybe designated in different ways. For example, the node maybe a different color or represented as a different shape, such as a star. Additionally, the history and future paths may be any color or alternatively may be represented as thicker, thinner, dashed or zig-zag lines.

When a mouse 105 is activated on one of these objects additional information is displayed in an information area. For example, if a history path is activated, all information regarding user paths into the highlighted node will be displayed. This may include the number of users who have traversed this path, where they came from, where they are going, what they are looking for, and how long they remained on a particular node. Additionally, included in the information may be a computation of estimated download time of a user traversing the selected path. This information assists analysts in determining the path's usability.

Figure 22:
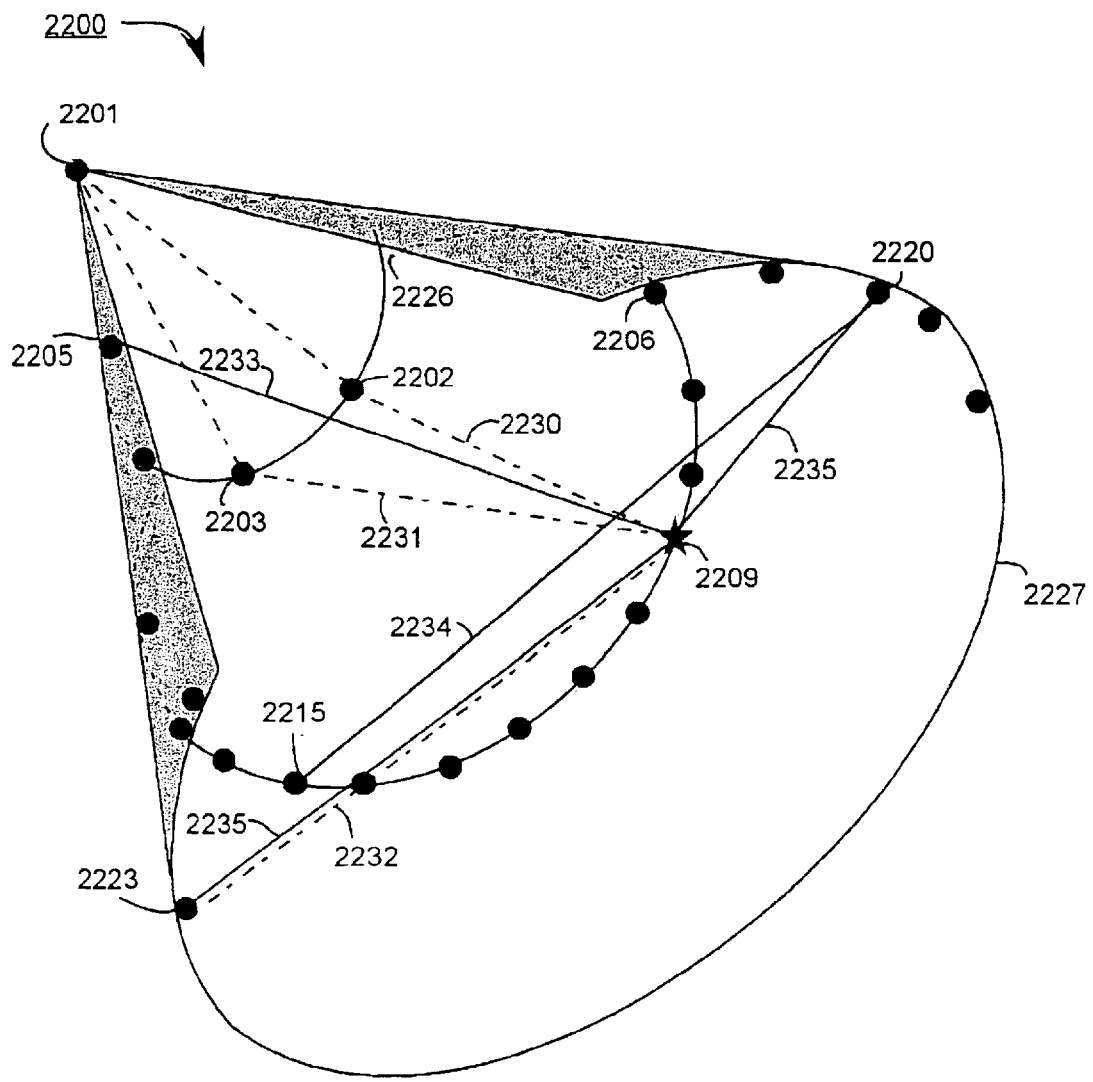
FIG. 22 illustrates a dome tree representation showing future paths and history paths, according to an embodiment of the present invention.

FIG. 22 illustrates a dome tree representation showing future paths and history paths into and out of node 2209, according to an embodiment of the present invention. In FIG. 22 node 2209 has been selected by mouse 105. History paths 2230, 2231, 2232 are represented by dashed lines, and future paths 2233, 2234, 2235 are represented by solid lines. Viewing this information an analyst can determine that users frequently traverse into node 2209 from nodes 2202 and 2203, and often travel to nodes 2205, 2215, and 2223. Of particular interest, it is evident from the diagram that users often travel out of node 2209 to node 2223, shown by future path 2235, and then return, shown by history path 2232.

Selecting a path or a portion of a path narrows the displayed information to just the information relating to the selected path, or portion thereof. This enables analysts to "drill down" to specific paths of interest quickly and easily. In an embodiment, the selected path or portion thereof will be displayed differently from the other information in the dome tree. For example, a selected path may be highlighted in red.

Given the ability to visualize usage patterns on web sites, analysts can now answer some interesting questions using the methods according to the present invention. (Such as: What devolved into deadwood? When did it? Was there a correlation with a restructuring ofthe web site? What evolved into a popular page? When did it? Was there a correlation with a restructuring of the web site? How was usage affected by items added over time? How was usage affected by items deleted over time?) A task that analysts often perform is finding the difference between two usage patterns. Given the ability to 'see' a visual pattern, the analyst often would like to know where the greatest differences are. That is, where is the greatest increase in usage, and where is the greatest decrease in usage? Are the usage changes tied to a particular topic or area in the web site?

Often a well-traveled path into or out of a node represents a group of users who have very similar information goals and are guided by the scent of the environment. Using a technique for predicting a user's information goals, such as the techniques described in co-pending U.S. patent application Ser. No. 09/540,063, entitled "System And Method Fort inferring User Information Need In A Hypermedia Linked Document Collection," incorporated above, results in a list of keywords which represent these predicted user goal. In an embodiment, upon selection of a path or a node, keywords relating to the selected path may be viewed. Keywords assist analysts and designers of web sites in understanding the goals of users traversing a particular path. Based on these keywords they can determine what types of information are important, and whether that information is easily obtainable. Analysts also can receive insights as to what users were thinking, or looking for, as they traveled along the Path. With this information, analysts can determine the efficiency of their site and also possibly provide additional or alternative solutions to the user's goals.

Similar to other embodiments of this invention, this embodiment is not only useful in planning, designing, and analyzing ones own site, it is also particularly useful when applied to a competitors site. For example, applying this technique to a competitors site, an analyst can determine which competitor products are resulting in high volume, or sales, or what type of information a competitors site provides that is often accessed by users.

Figure 23:
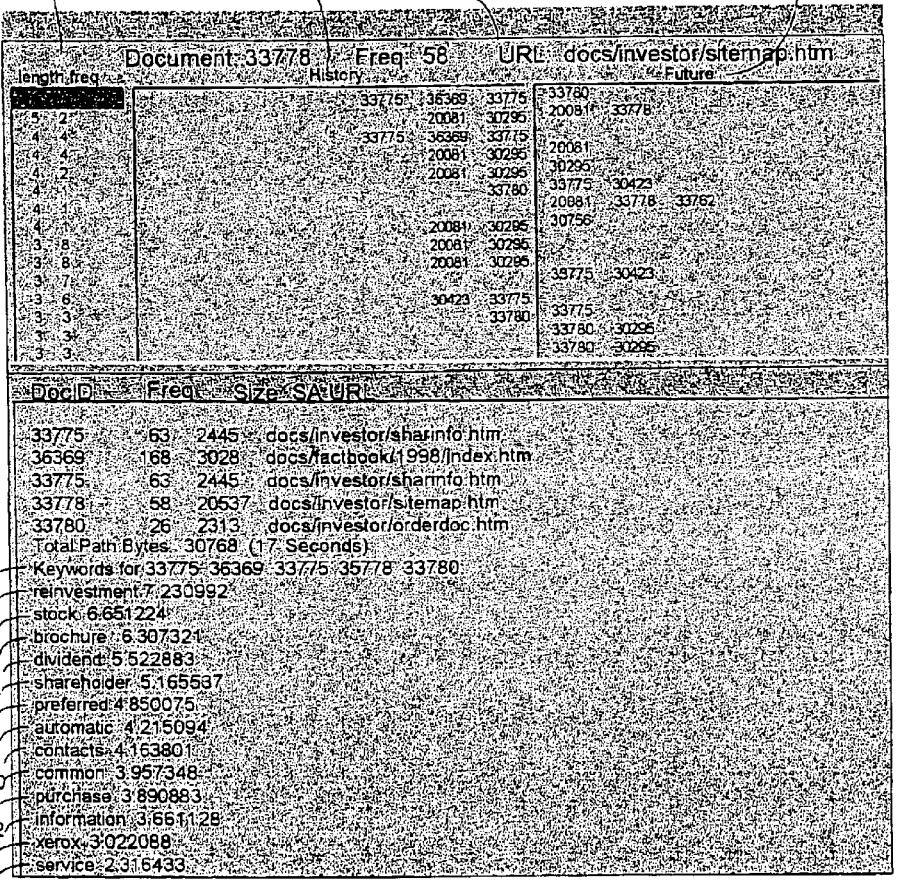
FIG. 23 illustrates a block diagram of an information page, according to an embodiment of the present invention.

FIG. 23 illustrates a block diagram of an information page 2300, according to an embodiment of the present invention. Upon selection of a node or a user path (history or future), an information page 2300 is displayed containing information regarding the selected object. For example, FIG. 23 illustrates an information page 2300 displayed as a result of selection of a node. Included in the information page 2300 is the nodes URL 2316, a list of history paths 2317, a list of future paths 2318, the frequency of which these paths were traveled, and keywords 2301, 2302, 2303, 2304, 2305, 2306, 2307, 2308, 2309, 2310, 2311, 2312, 2313, 2314, related to the node.

Another embodiment of the present invention describes a novel method of visualizing both predicted paths generated according to co-pending U.S. patent application Ser. No. 09/540,976, entitled "System And Method For Predicting Web User Flow By Determining Association Strength Of Hypermedia Links," incorporated above, and actual web paths simultaneously. In an embodiment, this information may be viewed simultaneously as a dome tree. The web site is laid out on the dome tree as described above and the scent related to each node may be viewed as a bar near the node. The length of the bar relates to the probability that the node will be accessed by a user traversing the site having a specific goal. The longer the bar, the higher the probability.

By visually comparing the predicted scent and actual user paths, an analyst can determine whether the web site is properly designed, and whether users are finding the information they need. It is especially useful for a large collection of documents. If the path and the scent predictions match, then users are navigating the site with success. If the paths and the scent predictions do not match, then it is possible that users are not finding the information because the design gives inappropriate cues.

A very practical application of an embodiment of the present invention is to one's own or a competitor's web site. More generally, it is applicable to any network that can be roughly approximated by a tree. The present invention enables web site visualization and thereby provides competitive intelligence for web site administrator and designers.

Figure 24:
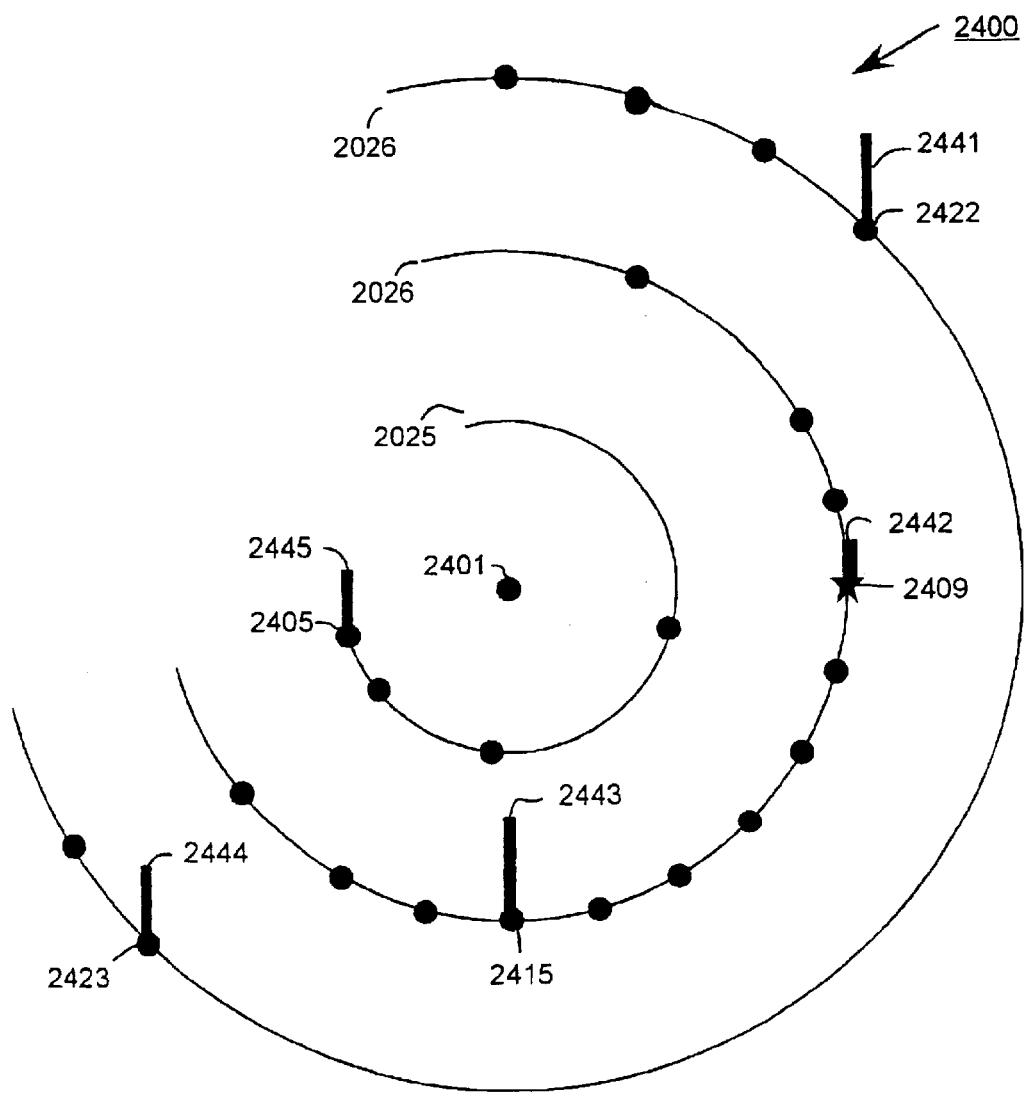
FIG. 24 illustrates a display of results of predicted user paths, according to an embodiment of the present invention.

FIG. 24 illustrates the results of predicted user paths through node 2409, according to an embodiment of the present invention. Using the technique for predicting user paths on selected node 2409, bars 2441, 2442, 2443, 2444 are generated. Bars 2441–2444 display the likelihood of where a user, traveling through node 2409 with a given goal, will end up. This likelihood is known as the scent. Based on the prediction, the node with the strongest scent is node 2415, represented by the longest bar 2443.

Figure 25:
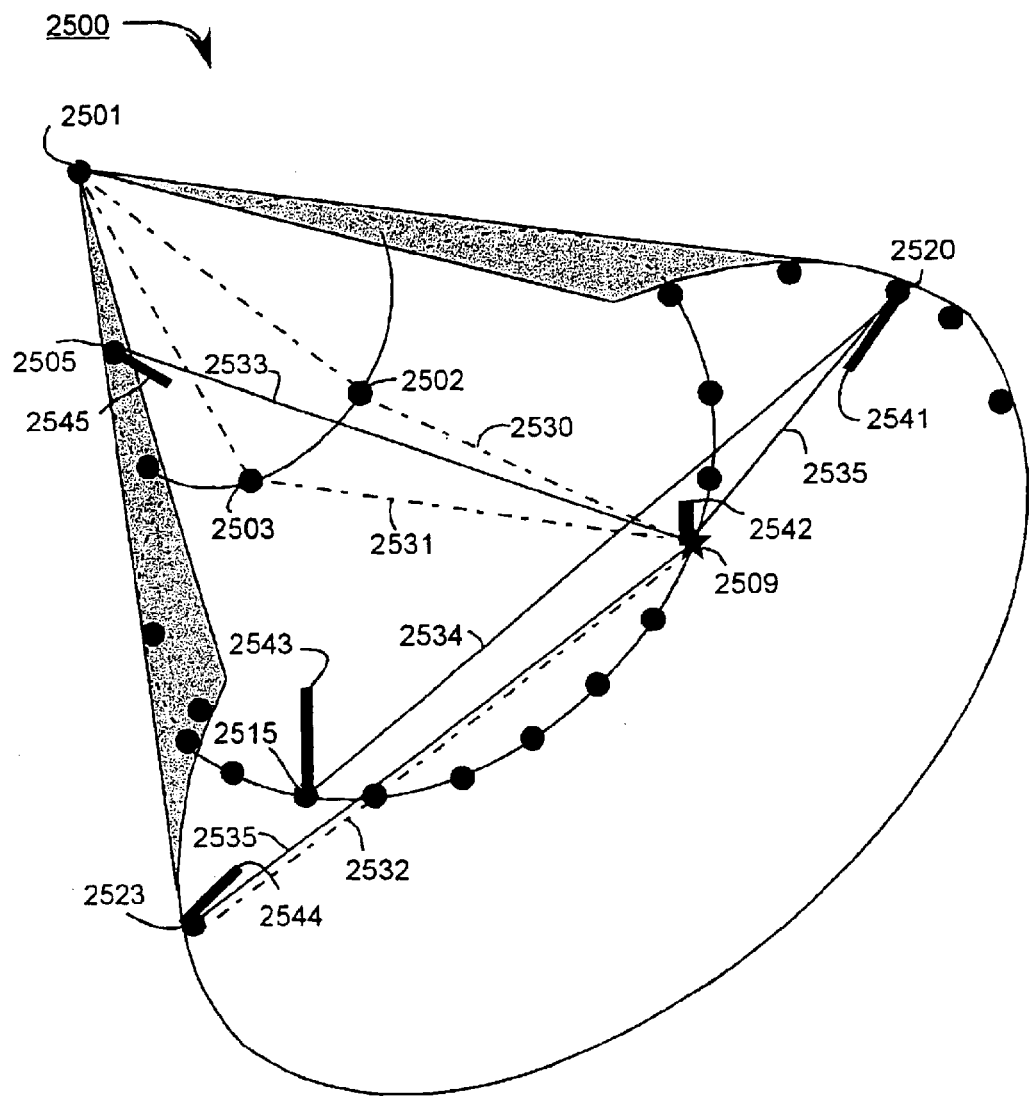
FIG. 25 illustrates a dome tree representation of FIG. 24, in accordance with an embodiment of the present invention.

FIG. 25 illustrates a dome tree representation 2500 of both actual user paths into and out of node 2509, and scents of predicted users traveling through node 2509. Node 2509 relates to corresponding node 2209 of FIG. 22 and node 2409 of FIG. 24. The history paths 2530, 2531, 2532 correspond to history paths 2230, 2231, 2232 of FIG. 22, and future paths 2533, 2534, 2535 correspond to future paths 2233, 2234, 2235 of FIG. 22. Similarly, bars 2541, 2542, 2543, 2544, 2545 correspond to bars 2441, 2442, 2443, 2444, 2445 of FIG. 24.

Displaying both the actual user paths through node 2509 and the related scents, analysts can easily determine whether a web site is well designed. In FIG. 25, by visualizing bars 2541–2545 the two longest bars 2543, and 2541 correspond to nodes 2515, and 2520, respectively, thus indicating that these two nodes have the strongest scent for users traversing through node 2509. By viewing this information with the actual user flow, it is apparent that the prediction matches the actual user flow. As can be seen, users of ten travel along future paths 2534 and 2535 to nodes 2520 and node 2523. While the current web design matches the predicted traffic, thereby indicating an efficient site, it appears that it is possible to make the site even more efficient and user friendly. By viewing the future lines it appears that the majority of individuals traveling to node 2515 first pass through node 2520. It may be possible to make the site more efficient by placing the information which is currently located at node 2515 at node 2520. Moving this information to node 2520 will enable a user to obtain all the information that they are searching for with only one hyperlink, there by saving time and money. Alternatively, if a direct link to node 2515 from node 2509 does not exist, the site may be more efficient by adding such a link.

The visualization methods, according to embodiments of the present invention expand the capabilities of web analysis programs in the amount of data they are able to display as well as allowing comparisons between actual usage paths to predicted patterns.

The foregoing description of embodiments of the invention has been presented for purposes of illustration and description. It is not intended to be exhaustive or to limit the invention to the precise form disclosed. Obviously many modifications and variations will be apparent to practitioners skilled in the art. The embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. A method for displaying a dome-tree structure having a root node, a plurality of first level nodes, and a plurality of second level nodes, the method comprising the steps of:

positioning the root node on a two dimensional plane;

positioning the plurality of first level nodes in the dome-tree structure radially outward a first distance from the root node;

positioning the plurality of second level nodes in the dome-tree structure radially outward a second distance from the root node; and, shilling the plurality of first level nodes a third distance relative to the plane, and shifting the plurality of second level nodes a fourth distance relative to the plane, thereby creating a three dimensional effect of a dome between the root node and the plurality of first level nodes and the plurality of second level nodes; wherein the dome is displaying having an outside surface and an inside surface and wherein the plurality of first level nodes and the plurality of second level nodes are displayed on the inside surface of the dome-tree structure.

2. The method of claim 1, wherein the fourth distance is greater than the third distance.

3. The method of claim 2, wherein the step of shifting the plurality of first level nodes is performed such that it appears that the first level is a step down onto the dome away from the root node.

4. The method of claim 1, wherein the root node is the parent of the plurality of first level nodes, and the plurality of first level nodes are the parents of the plurality of second level nodes.

5. The method of claim 4, wherein the layout angle for each node is measured from its parent.

6. The method of claim 1, wherein the step of placing the plurality of first level nodes of the tree structure radially about the root node is performed by placing the plurality of first level nodes radially about the root node between approximately 0 and approximately 270 degrees.

7. The method of claim 1, wherein the step of placing the plurality of first level nodes of the tree structure radially about the root node is performed by placing the plurality of first level nodes radially about the root node between approximately 0 and approximately 270 degrees; and, wherein the step of placing the plurality of second level nodes on the plane radially about the root node is performed by placing the plurality of second level nodes radially about the root node between approximately 0 and approximately 270 degrees.

8. The method of claim 1, further comprising the step of:

displaying a bar, near at least one of the plurality of first level nodes, representing a predicted probability that the node will be accessed.

9. A method for displaying information related to a node within a dome-tree structure, comprising the steps of:

displaying the dome-tree structure having an outside surface and an inside surface and wherein at least a portion of the outside surface and at least a portion of the inside surface of the dome-tree structure are not displayed, thereby creating a gap in the displayed dome-tree;

selecting the node;

displaying a first set of paths, representing paths into the node, responsive to selecting the node;

displaying a second set of paths, representing paths out of the node, responsive to selecting the node;

shifting the node a distance relative to a two dimensional plane, wherein the node is displayed on the inside surface of the dome-tree structure, and wherein the dome-tree is displayed having an outside surface and an inside surface; and, displaying a list of information related to the selected node.

10. The method of claim 9, wherein the list of information includes keywords, representing information goals.

11. The method of claim 9, wherein the list of information includes information related to the first set of paths.

12. The method of claim 9, wherein the list of information includes information related to the second set of paths.

13. An article of manufacture including an information storage medium wherein is stored information for programming a computer to perform a method of displaying a tree structure having a root node, a plurality of first level nodes, and a plurality of second level nodes, the method comprising the steps of:

positioning the root node on a two dimensional plane;

positioning the plurality of first level nodes in the free structure radially outward a first distance from the root node;

positioning the plurality of second level nodes in the tree structure radially outward a second distance from the root node; and, shifting the plurality of first level nodes a third distance relative to the plane, and shifting the plurality of second level nodes a fourth distance relative to the plane, thereby creating a three dimensional effect of a dome between the root node and the plurality of first level nodes and the plurality of second level nodes; wherein the dome is displayed having an outside surface and an inside surface and wherein the plurality of first level nodes and the plurality of second level nodes are displayed on the inside surface of the dome-tree structure.

14. An article of manufacture wherein information is stored for programming as in claim 13, wherein the fourth distance is greater than the third distance.

15. An article of manufacture wherein information is stored for programming as in claim 14, wherein the step of shifting the plurality of first level nodes is performed such that it appears that the first level is a step down onto the dome away from the root node.

16. An article of manufacture wherein information is stored for programming as in claim 13, wherein the root node is the parent of the plurality of first level nodes, and the plurality of first level nodes are the parents of the plurality of second level nodes.

17. An article of manufacture wherein information is stored for programming as in claim 16, wherein the layout angle for each node is measured from its parent.

18. An article of manufacture wherein information is stored for programming as in claim 13, wherein the step of placing the plurality of first level nodes of the tree structure radially about the root node is performed by placing the plurality of first level nodes radially about the root node between approximately 0 and approximately 270 degrees.

19. An article of manufacture wherein information is stored for programming as in claim 13, wherein the step of placing the plurality of first level nodes of the tree structure radially about the root node is performed by placing the plurality of first level nodes radially about the root node between approximately 0 and approximately 270 degrees; and, wherein the step of placing the plurality of second level nodes on the plane radially about the root node is performed by placing the plurality of second level nodes radially about the root node between approximately 0 and approximately 270 degrees.

20. An article of manufacture wherein information is stored for programming as in claim 13, the method further comprising the step of:

displaying a bar, near at least one of the plurality of first level nodes, representing a predicted probability that the node will be accessed.

21. An article of manufacture including an information storage medium wherein is stored information for programming a computer to perform a method of displaying information related to a node within a dome-tree structure, comprising the steps of:

displaying the dome-tree structure having an outside surface and an inside surface and wherein at least a portion of the outside surface and at least a portion of the inside surface of the dome-tree structure are not displayed, thereby creating a gap in the displayed dome-tree;

selecting the node;

displaying a first set of paths, representing paths into the node, responsive to selecting the node;

shifting the node a distance relative to a two dimensional plane, wherein the node is displayed on the inside surface of the dome-tree structure, and wherein the dome-tree is displayed having an outside surface and an inside surface; and, displaying a list of information related to the selected node.

22. An article of manufacture wherein information is stored for programming as in claim 21, wherein the list of information includes keywords, representing information goals.

23. An article of manufacture wherein information is stored for programming as in claim 21, wherein the list of information includes information related to the first set of paths.

24. An article of manufacture wherein information is stored for programming as in claim 21, wherein the list of information includes information related to the second set of paths.

25. An apparatus for displaying a tree structure having a root node, a plurality of first level nodes, and a plurality of second level nodes, comprising:

a processor;

a display device in communication with the processor; and, a processor readable storage medium in communication with the processor, containing process readable program code for programming the apparatus to perform a method of displaying the tree structure, the method comprising the steps of:
positioning the root node on a two dimensional plane;
positioning the plurality of first level nodes in the tree structure radially outward a first distance from the root node;
positioning the plurality of second level nodes in the tree structure radially outward a second distance from the root node; and,
shifting the plurality of first level nodes a third distance relative to the plane, and shifting the plurality of second level nodes a fourth distance relative to the plane, thereby creating a three dimensional effect of a dome between the root node and the plurality of first level nodes and the plurality of second level nodes; wherein the dome is displayed having an outside surface and an inside surface and wherein the plurality of first level nodes and the plurality of second level nodes are displayed on the inside surface of the dome-tree structure.

26. The apparatus of claim 25, wherein the fourth distance is greater than the third distance.

27. The apparatus of claim 26,
wherein the step of shifting the plurality of first level nodes is performed such that it appears that the first level is a step down onto the dome away from the root node.

28. The apparatus of claim 25,
wherein the root node is the parent of the plurality of first level nodes, and the plurality of first level nodes are the parents of the plurality of second level nodes.

29. The apparatus of claim 28,
wherein the layout angle for each node is measured from its parent.

30. The apparatus of claim 26,
wherein the step of placing the plurality of first level nodes of the tree structure radially about the root node is performed by placing the plurality of first level nodes radially about the root node between approximately 0 and approximately 270 degrees.

31. The apparatus of claim 25,
wherein the step of placing the plurality of first level nodes of the tree structure radially about the root node is performed by placing the plurality of first level nodes radially about the root node between approximately 0 and approximately 270 degrees; and,
wherein the step of placing the plurality of second level nodes on the plane radially about the root node is performed by placing the plurality of second level nodes radially about the root node between approximately 0 and approximately 270 degrees.

32. The apparatus of claim 26, further comprising the step of:
displaying a bar, near at least one of the plurality of first level nodes, representing a predicted probability that the node will be accessed.

33. An apparatus for displaying information related to a node within a dome-tree structure, comprising:
a processor;
a display device in communication with the processor; and,
a processor readable storage medium in communication with the processor, containing process readable program code for programming the apparatus to perform the method displaying information related to a node, the method comprising the steps of:
displaying the dome-tree structure having an outside surface and an inside surface and wherein at least a portion of the outside surface and at least a portion of the inside surface of the dome-tree structure are not displayed, thereby creating a gap in the displayed dome-tree;
selecting the node;
displaying a first set of paths, representing paths into the node, responsive to selecting the node;
shifting the node a distance relative to a two dimensional plane, wherein the node is displayed on the inside surface of the dome-tree structure, and wherein the dome-tree is displayed having an outside surface and an inside surface; and,
displaying a list of information related to the selected node.

34. The apparatus of claim 33,
wherein the list of information includes keywords, representing information goals.

35. The method of claim 33,
wherein the list of information includes information related to the first set of paths.

36. The apparatus of claim 33,
wherein the list of information includes information related to the second set of paths.

* * * * *